(12) United States Patent
Merril et al.

(10) Patent No.: US 7,689,898 B2
(45) Date of Patent: *Mar. 30, 2010

(54) ENHANCED CAPTURE, MANAGEMENT AND DISTRIBUTION OF LIVE PRESENTATIONS

(75) Inventors: Jonathan Merril, Great Falls, VA (US); Torsten Koehler, Ashburn, VA (US); Padma Kandarpa, Ashburn, VA (US); Rita Roy, Great Falls, VA (US)

(73) Assignee: Astute Technology, LLC, Reston, VA (US)

( * ) Notice: Subject to any disclaimer, the term of this patent is extended or adjusted under 35 U.S.C. 154(b) by 838 days.

This patent is subject to a terminal disclaimer.

(21) Appl. No.: 11/580,092

(22) Filed: Oct. 13, 2006

(65) Prior Publication Data

US 2007/0033528 A1 Feb. 8, 2007

Related U.S. Application Data

(63) Continuation-in-part of application No. 09/955,939, filed on Sep. 20, 2001, now abandoned, which is a continuation-in-part of application No. 09/073,871, filed on May 7, 1998, now Pat. No. 6,789,228.

(60) Provisional application No. 60/726,175, filed on Oct. 14, 2005.

(51) Int. Cl.
*G06F 17/00* (2006.01)
(52) U.S. Cl. ...................... 715/201; 715/273
(58) Field of Classification Search ................ 715/273, 715/201, 202, 203, 204; 345/632, 633
See application file for complete search history.

(56) References Cited

U.S. PATENT DOCUMENTS

| 4,399,455 A | 8/1983 | Alvarez |
| 4,609,779 A | 9/1986 | Rogers |
| 5,208,665 A * | 5/1993 | McCalley et al. ........... 725/119 |

(Continued)

OTHER PUBLICATIONS

Myers, et al., "A Multi-View Intelligent Editor for Digital Video Libraries," Proceedings of the First ACM/IEEE-CS Joint Conference on Digital Libraries, pp. 106-115 (Jan. 2001).

(Continued)

*Primary Examiner*—Laurie Ries
(74) *Attorney, Agent, or Firm*—Buchanan Ingersoll & Rooney PC

(57) ABSTRACT

Techniques are provided for converting live presentations into electronic media and managing captured media assets for distribution. An exemplary system includes capture devices that capture media assets of live presentations comprising a session, including image data of sequentially presented visual aids accompanying the live presentations and audio data. Each capture device has an interface for real-time image data marking of the image data for identification of individual images and session marking of the image data for demarcation of individual presentations of the session. A centralized device processes the captured media assets and automatically divides the captured media assets into discrete files associated with the individual presentations based on the session markings. An administrative tool manages the processed media assets to produce modified presentations and enables modification of the visual aid images identified by the image data markings. A production device formats the modified presentations for distribution on distribution media.

50 Claims, 30 Drawing Sheets

U.S. PATENT DOCUMENTS

| | | | |
|---|---|---|---|
| 5,414,481 A | 5/1995 | Fujioka et al. | |
| 5,473,744 A | 12/1995 | Allen et al. | |
| 5,638,543 A | 6/1997 | Pedersen et al. | |
| 5,649,060 A | 7/1997 | Ellozy et al. | |
| 5,659,793 A * | 8/1997 | Escobar et al. | 715/202 |
| 5,664,218 A | 9/1997 | Kim et al. | |
| 5,786,814 A | 7/1998 | Moran et al. | |
| 5,812,736 A | 9/1998 | Anderson | |
| 5,818,800 A | 10/1998 | Barker | |
| 5,835,667 A | 11/1998 | Wactlar et al. | |
| 5,956,668 A | 9/1999 | Alshawi et al. | |
| 5,978,818 A | 11/1999 | Lin | |
| 5,983,236 A | 11/1999 | Yager et al. | |
| 5,990,931 A | 11/1999 | Nimri et al. | |
| 5,991,735 A | 11/1999 | Gerace | |
| 5,995,095 A | 11/1999 | Ratakonda | |
| 6,006,241 A | 12/1999 | Purnaveja et al. | |
| 6,008,807 A | 12/1999 | Bretschneider et al. | |
| 6,025,827 A | 2/2000 | Bullock et al. | |
| 6,031,526 A | 2/2000 | Shipp | |
| 6,038,257 A | 3/2000 | Brusewitz et al. | |
| 6,041,333 A | 3/2000 | Bretschneider et al. | |
| 6,072,480 A | 6/2000 | Gorbet et al. | |
| 6,084,582 A | 7/2000 | Qureshi et al. | |
| 6,085,047 A | 7/2000 | Taka | |
| 6,100,881 A | 8/2000 | Gibbons et al. | |
| 6,108,001 A | 8/2000 | Tuttle | |
| 6,108,687 A | 8/2000 | Craig | |
| 6,141,001 A | 10/2000 | Baleh | |
| 6,154,207 A * | 11/2000 | Farris et al. | 715/210 |
| 6,160,907 A | 12/2000 | Robotham et al. | |
| 6,198,477 B1 | 3/2001 | Kurtze et al. | |
| 6,240,459 B1 | 5/2001 | Roberts et al. | |
| 6,295,543 B1 | 9/2001 | Block et al. | |
| 6,463,426 B1 | 10/2002 | Lipson et al. | |
| 6,665,835 B1 | 12/2003 | Gutfreund et al. | |
| 6,728,753 B1 | 4/2004 | Parasnis et al. | |
| 6,789,228 B1 | 9/2004 | Merril et al. | |
| 2002/0036694 A1 | 3/2002 | Merril | |
| 2002/0091991 A1 * | 7/2002 | Castro | 717/106 |
| 2002/0133520 A1 | 9/2002 | Tanner | |
| 2002/0175991 A1 | 11/2002 | Pflaum et al. | |
| 2002/0194592 A1 * | 12/2002 | Tsuchida et al. | 725/32 |
| 2003/0014135 A1 | 1/2003 | Moulios | |
| 2004/0039834 A1 * | 2/2004 | Saunders et al. | 709/231 |
| 2004/0117427 A1 | 6/2004 | Allen et al. | |
| 2005/0044499 A1 | 2/2005 | Allen et al. | |
| 2005/0097470 A1 | 5/2005 | Dias et al. | |
| 2006/0029296 A1 * | 2/2006 | King et al. | 382/313 |
| 2007/0061487 A1 * | 3/2007 | Moore et al. | 709/246 |

OTHER PUBLICATIONS

Karam, Gerald M., "Visualization Using Timelines," Proceedings of the 1995 ACM SIGSOFT International Symposium on Software Testing and Analysis, pp. 125-137 (Aug. 1994).

Kuo, et al., "A Synchronization scheme for multimedia annotation," IEEE, pp. 594-598 (1997).

Lienhart, et al., "Video Abstracting," Communications of the ACM, vol. 40, No. 12, pp. 54-63 (Dec. 1997).

Mediasite Overview Brochure, http://www.sonicfoundry.com/main.aspx?dir=mediasite&subpage=introduction, pp. 1-14 (printed on Oct. 13, 2006).

Pullen, Mark J., "Synchronous distance education via the internet," IEEE, pp. 285-288 (Nov. 1996).

Uchihashi, et al., "Video Manga: Generating Semantically Meaningful Video Summaries," Proceedings of the Seventh ACM International Conference on Multimedia (Part 1), pp. 383-392 (Oct. 1999).

* cited by examiner

ENHANCED CAPTURE, MANAGEMENT AND DISTRIBUTION OF LIVE PRESENTATIONS

This application is a continuation-in-part of U.S. application Ser. No. 09/955,939, filed Sep. 20, 2001, which is a continuation-in-part of U.S. Pat. No. 6,789,228, issued Sep. 7, 2004, both of which are herein incorporated by reference in their entireties. This application also claims the benefit of U.S. Provisional Application 60/726,175, filed Oct. 14, 2005, which is herein incorporated by reference in its entirety.

BACKGROUND

1. Field of the Invention

The present invention generally relates to a data processing system for digitally recording and reproducing lectures/presentations in physical and electronic format. More particularly, the present invention relates to the capture, management, and distribution of live presentations.

2. Related Art

The majority of corporate and educational institution training occurs in the traditional lecture format in which a speaker addresses an audience to disseminate information (i.e., a "live" presentation). Due to difficulties in scheduling and geographic diversity of speakers and intended audiences, a variety of techniques for recording the content of these lectures have been developed. These techniques include videotapes, audio tapes, transcription to written formats and other means of converting lectures to analog (non-computer based) formats, and converting lectures to appropriate digital formats for use over the Internet.

A challenge arises with respect to capture and distribution of live presentations at conferences and meetings, during which a large number of lectures might be delivered over the course of one or several days, thereby making it difficult for a conference attendee to attend each of the lectures. Because such conferences have limited "shelf-life," speed to market of the conference content is a critical element of success. Also important is the ability to accurately capture presentation content for distribution such that the captured content is precise in its presentation and has the necessary speaker permissions (i.e., does not contain information containing copyrighted materials without having the necessary permissions associated with them). Additionally, as greater quantities of presentation content are captured over relatively short periods of time, and as rapid release of the content becomes increasingly important, effective management of the captured presentations is needed.

SUMMARY

Systems and methods are described herein that can be employed for rapid conversion of live presentations into electronic media and for effective management of captured media assets for distribution.

An exemplary system for capturing and distributing presentations includes at least two capture devices configured to capture media assets of live presentations comprising a session, the media assets including 1) image data of a plurality of sequentially presented visual aids accompanying the live presentations and 2) audio data. At least two of the visual aids are selected from the group of images consisting of slides, photographs, graphs, discrete motion picture clips, and text. Each capture device includes an interface that enables real-time 1) image data marking of the image data for identification of individual images and 2) session marking of the image data for demarcation of individual presentations of the session. A centralized device is configured to process the captured media assets from each capture device. The centralized device is configured to automatically divide the captured media assets for the session into discrete files associated with the individual presentations based on the session markings. An administrative tool is configured to manage the processed captured media assets to produce modified presentations. The administrative tool enables modification of the visual aid images identified by the image data markings. A production device is configured to format the modified presentations of at least one session for distribution on distribution media.

Another exemplary system for capturing and distributing presentations includes means for capturing media assets of live presentations comprising a session, the media assets including 1) image data of a plurality of sequentially presented visual aids accompanying the live presentations and 2) audio data. At least two of the visual aids are selected from the group of images consisting of slides, photographs, graphs, discrete motion picture clips, and text. The system includes means for real-time image data marking of the image data for identification of individual images and means for real-time session marking of the image data for demarcation of individual presentations of the session. Means for processing the captured media assets are configured to automatically divide the captured media assets for the session into discrete files associated with the individual presentations based on the session markings. Means for managing the processed captured media assets to produce modified presentations are configured to modify the visual aid images identified by the image data markings. The system also includes means for formatting the modified presentations of at least one session for distribution on distribution media.

An exemplary method for capturing and distributing presentations includes capturing media assets of live presentations comprising a session, the media assets including 1) image data of a plurality of sequentially presented visual aids accompanying the live presentations and 2) audio data. At least two of the visual aids are selected from the group of images consisting of slides, photographs, graphs, discrete motion picture clips, and text. The capturing includes real-time 1) image data marking of the image data for identification of individual images and 2) session marking of the image data for demarcation of individual presentations of the session. The method also includes processing the captured media assets for the session. The processing includes automatically dividing the captured media assets for the session into discrete files associated with the individual presentations based on the session markings. The method further includes managing the processed captured media assets to produce modified presentations. The managing includes modifying the visual aid images identified by the image data markings. Additionally, the method includes formatting the modified presentations of at least one session for distribution on distribution media.

These and other features of the present disclosure will be readily appreciated by one of ordinary skill in the art from the following detailed description of various implementations when taken in connection with the accompanying drawings.

DETAILED DESCRIPTION

Figure 1:
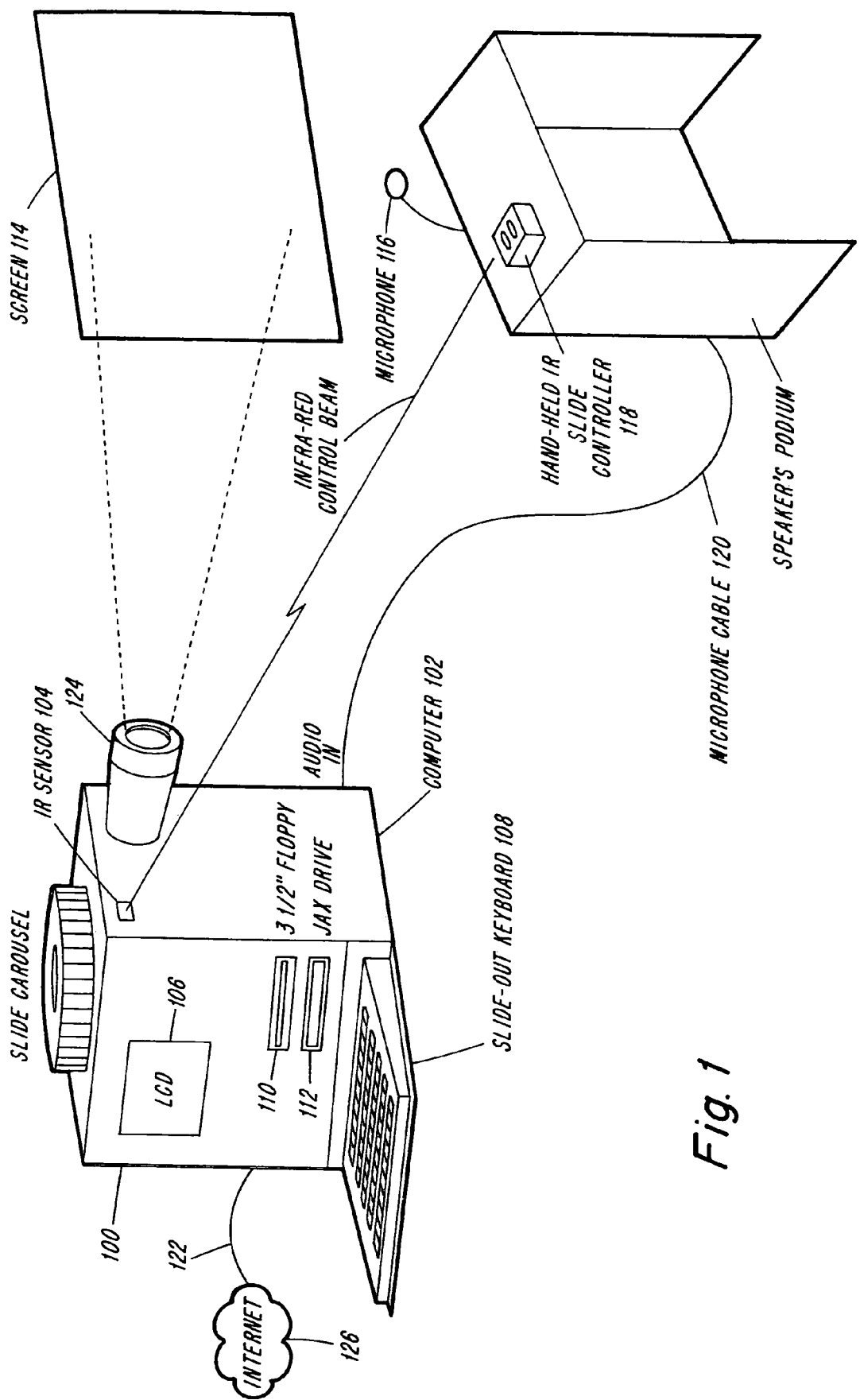
FIG. 1 illustrates hardware components of a system consistent with the present disclosure.

Systems consistent with the present disclosure digitally capture lecture presentation slides and speech and store the data in a memory. They also prepare this information for Internet publication and publish it on the Internet for distribution to end-users. These systems comprise three main functions: (1) capturing the lecture and storing it into a computer memory or database, (2) generating a transcript from the lecture and the presentation slides and automatically summarizing and outlining transcripts, and (3) publishing the lecture slides image data, audio data, and transcripts on the Internet for use by Internet end-users.

In one implementation, slides can be generated using conventional slide projectors. In this case, when a presenter begins presenting, and a first slide is displayed on the projection screen by a projector, a mirror assembly can change the angle of the light being projected on the screen for a brief period of time to divert it to a digital camera. At this point, the digital camera captures the slide image, transfers the digital video image data to the computer, and the digital video image data can be stored on the computer. The mirror assembly then quickly flips back into its original position to allow the light to be projected on the projection screen as the presenter speaks. When this occurs, an internal timer on the computer begins counting. This timer marks the times of the slide changes during the lecture presentation. Simultaneously, the system begins recording the sound of the presentation when the first slide is presented. The digital images of the slides and the digital audio recordings are stored on the computer along with the time stamp information created by the timer on the computer to synchronize the slides and audio.

Upon each subsequent slide change, the mirror assembly quickly diverts the projected light to the digital camera to capture the slide image in a digital form, and then it flips back into its original position to allow the slide to be displayed on the projection screen. The time of the slide changes, marked by the timer on the computer, is recorded in a file on the computer. At the end of the presentation, the audio recording stops, and the computer memory stores digital images of each slide during the presentation and a digital audio file of the lecture speech. Additionally, the computer memory also stores a file denoting the time of each slide change.

Alternatively, in another implementation, slides can be generated without using conventional slide projectors. For example, a computer generated slide presentation can be used, thereby avoiding the need of the mirror assembly and the digital camera. In this case, data from application software, such as PowerPoint® (available from Microsoft Corporation of Redmond, Wash.), or from any other application software a presenter is using to generate a presentation on his or her computer, can be captured. The digital video image data of a presentation slide from the presenter's computer can be transferred to the capture system's computer at the same time that the slide is projected onto the projection screen. Similarly, slides may be projected from a machine using overhead transparencies or paper documents. This implementation also avoids the need for the mirror assembly and the digital camera, because, like the computer generated presentations, the image data is transferred directly to the capture system's computer for storage at the same time that the image data is projected onto the projection screen. Any of these methods or other methods may be used to capture digital video image data of the presentation slides in the capture system's computer. Once stored in the computer, the digital video and audio files may be published to the Internet or, optionally, enhanced for more efficient searching on the Internet.

During optional lecture enhancement, optical character recognition software can be applied to each slide image to obtain a text transcript of the words on a slide image. Additionally, voice recognition software can be applied to the digital audio file to obtain a transcript of the lecture speech. To enhance recognition accuracy, each presenter may read a standardized text passage (either in a linear or interactive fashion, in which the system re-prompts the presenter to re-state passages that are not recognized in order to enhance recognition accuracy) into the system prior to presenting and, in doing so, provide the speech recognition system with additional data to increase recognition accuracy. Speech recognition systems, which provide for interactive training and make use of standardized passages (which the presenter reads into the system) to increase accuracy, are available from a variety of companies including Microsoft, IBM and others. Once transcripts are obtained, automatic summarization and outlining software can be applied to the transcripts to create indexes and outlines that are easily searchable by an end-user. In addition to the enhanced files, the end-user can also search the whole transcript of the lecture speech.

Alternatively, if Closed Captioning is used during a presentation, the Closed Caption data can be parsed from the input to the device and a time-stamp can be associated with the captions. Parsing of the Closed Caption data can occur either through the use of hardware (e.g., with Closed Caption decoder chips), such as those offered by Philips Electronics, or software, such as that offered by Ccaption (ccaption.com on the World Wide Web). The Closed Caption data can be used to provide indexing information for use in search and retrieval for all or parts of individual or groups of lectures.

In addition, information and data, which are used during the course of presentation(s), can be stored in the system to allow for additional search and retrieval capabilities. The data contained and associated with files used in a presentation can be stored and this data can be used in part or in whole to provide supplemental information for search and retrieval. Presentation materials often contain multiple media types including text, graphics, video, and animations. With extraction of these materials, they can be placed in a database to allow additional search and retrieval access to the content. Alternatively, the data can be automatically indexed using products, which provide this functionality, such as Microsoft Index Server or Microsoft Portal Server.

Finally, after transferring the files to a database, systems consistent with the present disclosure can publish these slide image files, audio files and transcript files to the Internet for use by Internet end-users. These files can be presented so that an Internet client can efficiently search and view the lecture presentation.

Systems consistent with the present disclosure thus allow a lecture presentation to be recorded and efficiently transferred to the Internet as active or real-time streaming files for use by end-users. The present disclosure therefore describes systems that are not only efficient at publishing lectures on the Web, but can be efficient at recording the content of meetings, whether business, medical, judicial or another type of meeting. At the end of a meeting, for instance, a record of the meeting complete with recorded slides, audio and perhaps video can be stored. The stored contents can be placed on a removable media such as compact discs, digital versatile discs, flash memory, magnetic memory, or any type of recordable media to be carried away by one or more of the meeting participants.

Further, the present disclosure can be implemented as an effective teleconferencing mechanism. Specifically, so long as a participant in a teleconference has a capture device in accordance with the present disclosure, his or her presentation can be transmitted to other participants using the recorded presentation, which has been converted to a suitable Internet format. The other teleconference participants can use similar devices to capture, enhance and transmit their presentations, or simply have an Internet enabled computer, Internet enabled television, wireless device with Internet access or like devices.

These and further aspects of the systems and methods will be described in the following sections. The explanation will be by way of exemplary embodiments to which the present invention is not limited.

System Description

Figure 2:
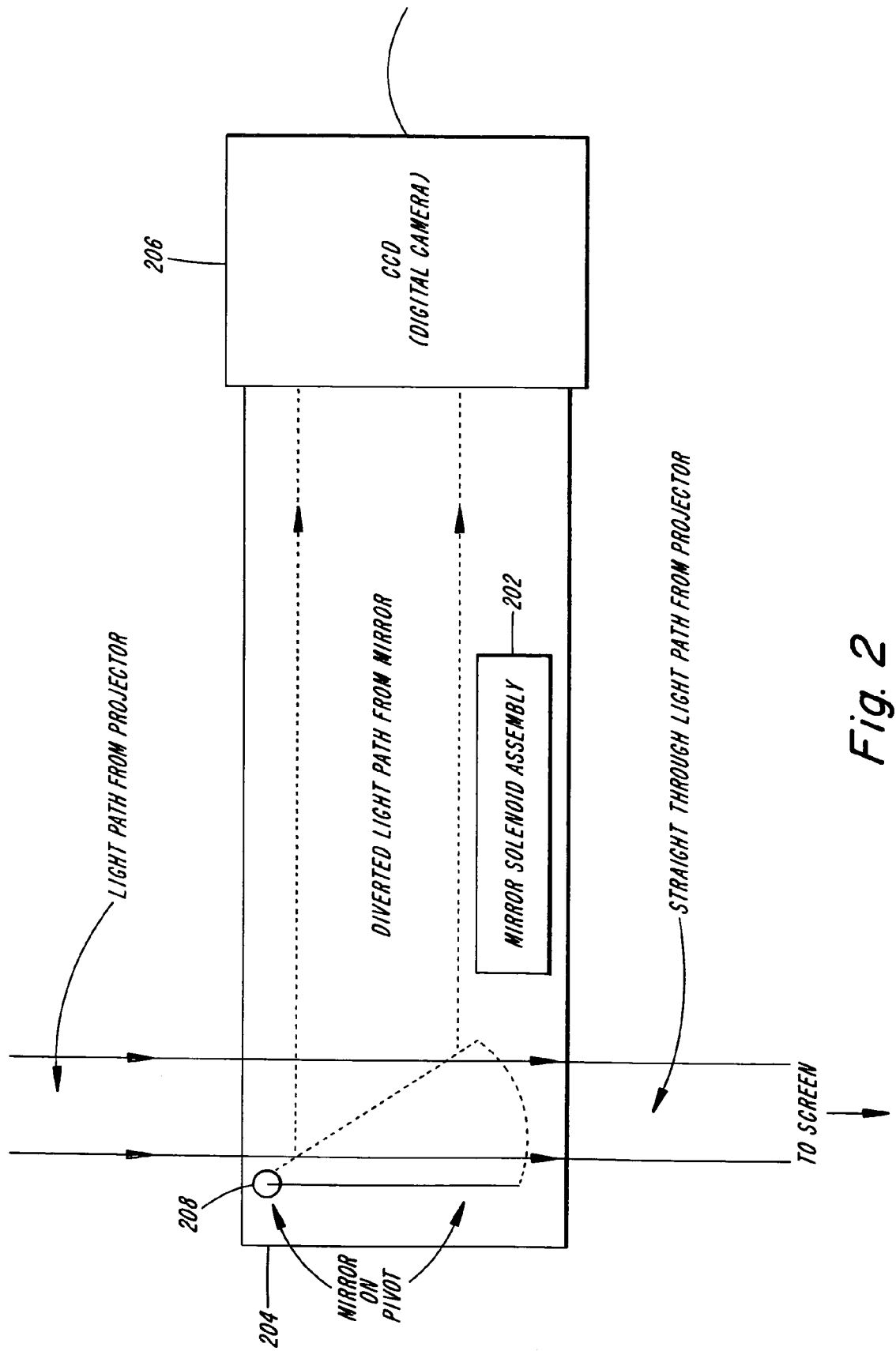
FIG. 2 illustrates a mirror assembly used to redirect light from a projection device to a digital camera consistent with the present disclosure.

FIGS. 1 and 2 illustrate hardware components in a system consistent with the present disclosure. Although FIG. 1 shows an implementation with a slide projector, the system allows a presenter to use a variety of media for presentation, such as, but not limited to, 35 mm slides, computer generated stored and/or displayed presentations, overhead transparencies or paper documents. Implementations using overhead transparencies and paper documents will be discussed below with reference to FIG. 4.

FIG. 1 demonstrates an exemplary system with an integrated 35 mm slide projector 100 that contains a computer as a component or a separate unit. The output of the projection device passes through an optical assembly that contains a mirror, as shown in FIG. 2. In the implementation shown in FIG. 1, the mirror assembly 204 is contained in the integrated slide projector 100 behind the lens 124 and is not shown on the FIG. 1. This mirror assembly 204 diverts the light path to a charge-coupled device (CCD) 206 for a brief period of time so that the image may be captured. A CCD 206 is a solid-state device that converts varying, light intensities into discrete digital signals, and most digital cameras (e.g., the Pixera Professional Digital Camera available from Pixera Corporation of Los Gatos, Calif.) use a CCD for the digital image capturing process. The video signal carrying the digital video image data from the CCD 206, for example, enters a computer 102, which is integrated within the projection box in this implementation, via a digital video image capture board contained in the computer (e.g., TARGA 2000 RTX PCI video board available from Truevision of Santa Clara, Calif.). Naturally, the image signal can be video or a still image signal. This system can be equipped with a device (e.g., Grand TeleView available from Grandtec UK Limited, Oxon, UK) that converts from an SVGA or Macintosh computer output signal into a format which can be captured by the Truevision card, whereas the Truevision card accepts an NTSC (National Television Standards Committee) signal.

As the presenter changes slides or transparencies, the computer 102 can automatically record the changes. Changes can be detected either by an infrared (IR) slide controller 118 and IR sensor 104, a wired slide controller (not shown) or an algorithm driven scheme implemented in the computer 102 which detects changes in the displayed image.

As shown in FIG. 2, when a slide change is detected either via the slide controller 118 or an automated algorithm, the mirror 208 of the mirror assembly 204 is moved into the path of the projection beam at a 45-degree angle. A solenoid 202, which is an electromagnetic device often used as a switch, can control the action of the mirror 208. This action directs all of the light away from the projection screen 114 and towards the CCD 206. The image is brought into focus on the CCD 206, digitally encoded and transmitted to the computer 102 via the video-capture board 302 (shown in FIG. 3 described below). At this point, the mirror 208 flips back to the original position allowing the light for the new slide to be directed towards the projection screen 114. This entire process can takes less than one second, since the image capture is a rapid process. Further, this rapid process is not easily detectable by the audience since there is already a pause on the order of a second between conventional slide changes. In addition, the exact time of the slide changes, as marked by a timer in the computer, can be recorded in a file on the computer 102.

Figure 3:
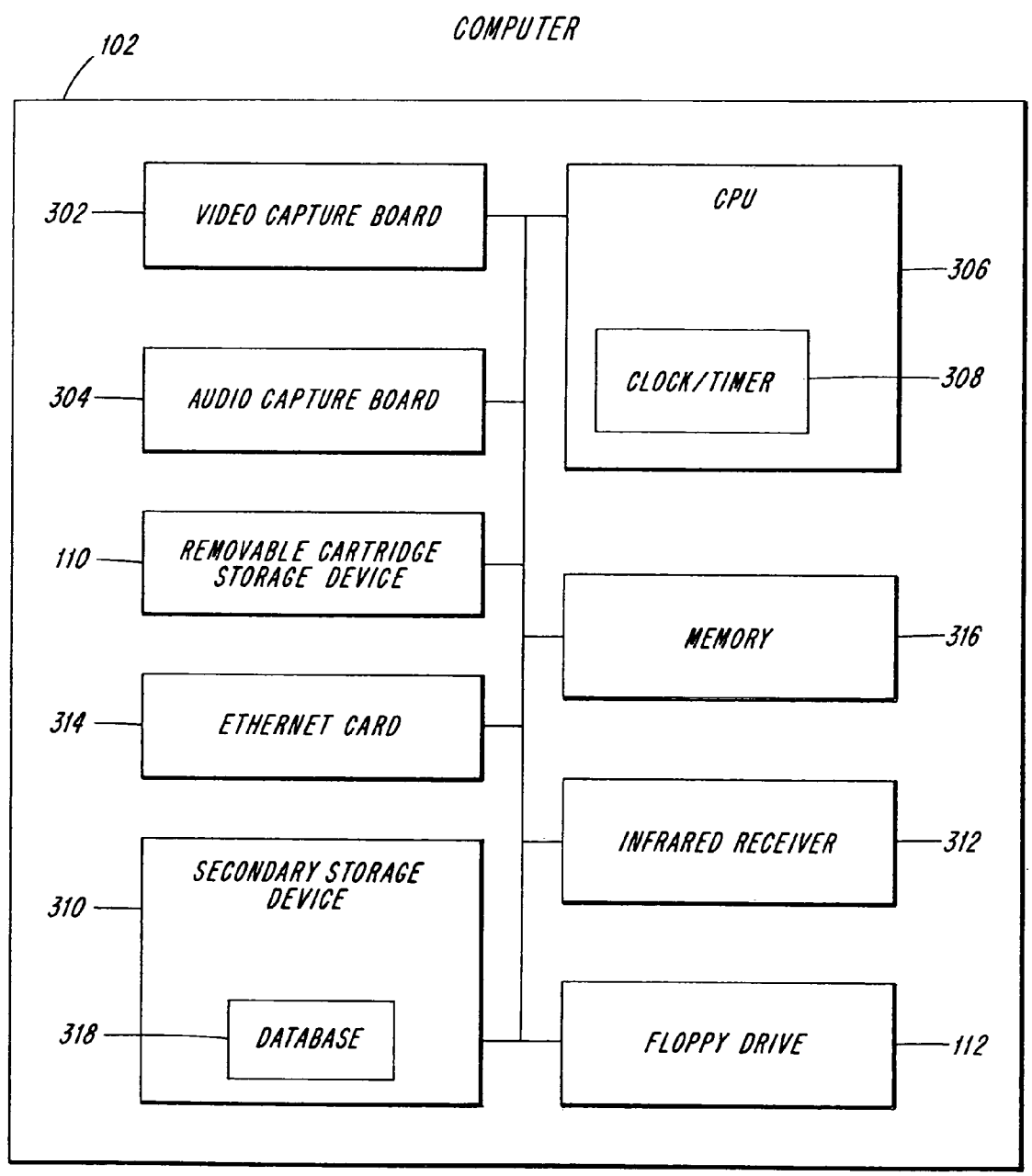
FIG. 3 depicts the components of a computer consistent with the present disclosure.

FIG. 3 depicts the computer 102 contained in the integrated slide projector 100 in this implementation. The computer 102 includes a CPU 306 capable of running Java applications (such as the Intel Pentium (e.g., 400 MHz Pentium II Processors), central processors, and Intel Motherboards (IntelB N440BX server board) from Intel of Santa Clara, Calif.), an audio capture card 304 (e.g., AWE64 SoundBlaster™ available from Creative Labs of Milpitas, Calif.), a video capture card 302, an Ethernet card 314 for interaction with the Internet 126, a memory 316, and a secondary storage device 310. In one implementation, the secondary storage device 310 can be a combination of solid state Random Access Memory (RAM) that buffers the data, which is then written onto a Compact Disc Writer (CD-R) or Digital Versatile Disc Writer (DVD-R). Alternatively a combination or singular use of a hard disk drive, or removable storage media and RAM can be used for storage. Using removable memory as the secondary storage device 310 enables participants to walk away from a lecture or meeting with a complete record of the content of the lecture or meeting. Thus, neither notes nor complicated, multi-format records will have to be assembled and stored, and capturing the actual contents of the lecture or meeting is made simple and contemporaneous. Participant(s) can simply leave the lecture or meeting with an individual copy of the lecture or meeting contents on a physical storage medium.

The computer 102 can also include or be connected to an infrared receiver 312 to receive a slide change signal from the slide change controller 118. The CPU 306 can also have a timer 308 for marking slide change times, and the secondary storage device 310 can contain a database 318 for storing and organizing the lecture data. The system can also allow for the use of alternative slide change data (which is provided as either an automated or end-user selectable feature) obtained from any combination or singular use of: (1) a computer keyboard which can be plugged into the system, (2) software running on a presenter's presentation computer which can send data to the capture device, or (3) an internally generated timing event within the capture device which triggers image capture. For example, image capture of the slide(s) can be timed to occur at predetermined or selectable periods. In this way, animation, video inserts, or other dynamic images in computer generated slide presentations can be captured, at least as stop action sequences. Alternatively or additionally, the slide capture can be switched to a video or animation capture during display of dynamically changing images, such as that which occurs with animation or video inserts in computer generated slides. Thus, the presentation can be fully captured including capture of dynamically changing images, with a potential increase in file size.

Referring back to FIG. 1, the computer 102 can include an integrated LCD display panel 106, and a slide-out keyboard 108, which can be used to switch among three modes of operation discussed below. For file storage and transfer to other computers, the computer 102 can also include a floppy drive 112 and a high-capacity removable media drive 110, such as a JaZ™ drive available from Iomega of Roy, Utah (iomega.com on the World Wide Web), among other devices. The computer 102 may also be equipped with multiple CPUs 306, thus enabling the performance of several tasks simultaneously, such as capturing a lecture and serving a previously captured lecture over the Internet.

Simultaneously with the slide capturing, audio signals can be recorded using a microphone 116 connected by a cable 120 to the audio capture card 304, which is an analog-to-digital converter in the computer 102, and the resulting audio files can be placed into the computer's 102 secondary storage device 310, in this exemplary embodiment.

In one implementation consistent with the present disclosure, the presentation slides are computer generated. In the case of a computer generated presentation, the image signal from the computer (not shown) generating the presentation slides is sent to a VGA to NTSC conversion device and then to the video capture board 302 before it is projected onto the projection screen 114, thus eliminating the need to divert the beam or use the mirror assembly 204 or the CCD 206. This also results in a higher-quality captured image.

Figure 4:
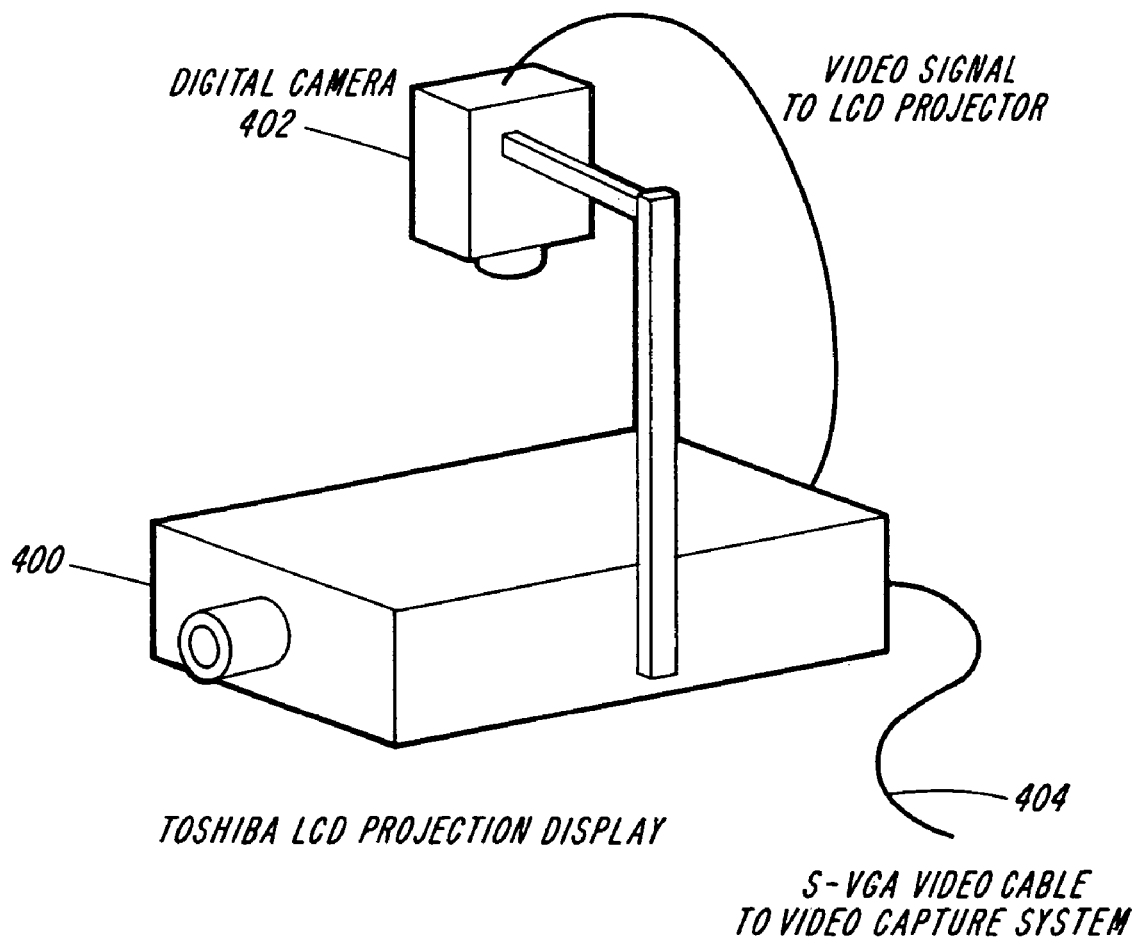
FIG. 4 illustrates alternate connections to an overhead projector and LCD projector consistent with the present disclosure.

FIG. 4 illustrates hardware for use in another implementation in which overhead transparencies or paper documents are used instead of slides or computer generated images. Shown in FIG. 4 is an LCD projector 400 with an integrated digital camera 402, such as the Toshiba MediaStar TLP-511 U. This projection device allows overhead transparencies and paper documents to be captured and converted to a computer image signal, such as an SVGA signal. This SVGA signal can then be directed to an SVGA-input cable 404. In this case, the computer 102 can detect the changing of slides via an algorithm that senses abrupt changes in image signal intensity, and the computer 102 can record each slide change. As in the computer generated implementation, the signal can be captured directly before being projected (i.e., the mirror assembly 204 and CCD 206 combination shown in FIG. 2 is not necessary).

In one implementation, optical character recognition can be performed on the captured slide data using a product such as EasyReader Elite™ from Mimetics of Cedex, France. Also, voice recognition can be performed on the lecture audio using a product such as Naturally Speaking™ available from Dragon Systems of Newton, Mass. The optical and voice recognition processes can be used to generate text documents containing full transcripts of both slide content and audio of an actual lecture. In another implementation, these transcripts can be processed by outline-generating software, such as LinguistX™ from InXight of Palo Alto, Calif., which can summarize the lecture transcripts, improve content searches and provide indexing. Other documents and information can then be linked to the lecture (e.g., an abstract, author name, date, time, and location) based on the content determination. The information contained in the materials (or the native files themselves) used during the presentation can also be stored into the database to enhance search and retrieval through any combination or singular use of: (1) the data in a native format which is stored within a database, (2) components of the information stored in the database, and (3) pointers to the data which are stored in the database.

Most of these documents (except, e.g., those stored in their native format), along with the slide image information, are converted to Web-ready formats. This audio, slide, and synchronization data can be stored in the database 318 (e.g., Microsoft SQL) which is linked to each of the media elements. The linkage of the database 318 and other media elements can be accomplished with an object-linking model, such as Microsoft's Component Object Model (COM). The information stored in the database 318 can be made available to Internet end-users through the use of a product such as Microsoft Internet Information Server (IIS) software, among others, and can be configured to be fully searchable.

Methods and systems consistent with the present disclosure thus enable the presenter to give a presentation and have the content of the lecture made available on the Internet with little intervention. While performing the audio and video capture, the computer 102 can automatically detect slide changes (i.e., via the infrared slide device or an automatic sensing algorithm), and the slide change information can be encoded with the audio and video data. In addition, the Web-based lecture can contain data not available at the time of the presentation such as transcripts of both the slides and the narration, and an outline of the entire presentation. The presentation can be organized using both time coding and the database 318, and can be searched and viewed using a standard Java™ enabled Web-interface, such as Netscape Navigator™. Java is a platform-independent, object-oriented language created by Sun Microsystems™. The Java programming language is further described in "The Java Language Specification" by James Gosling, Bill Joy, and Guy Steele, Addison-Wesley, 1996, which is herein incorporated by reference. In one implementation, the computer 102 can serve the lecture information directly to the Internet if a network connection 122 is established using the Ethernet card 314 or modem (not shown). Custom software, written in Java for example, can be used to integrate all of the needed functions for the computer.

Figure 5:
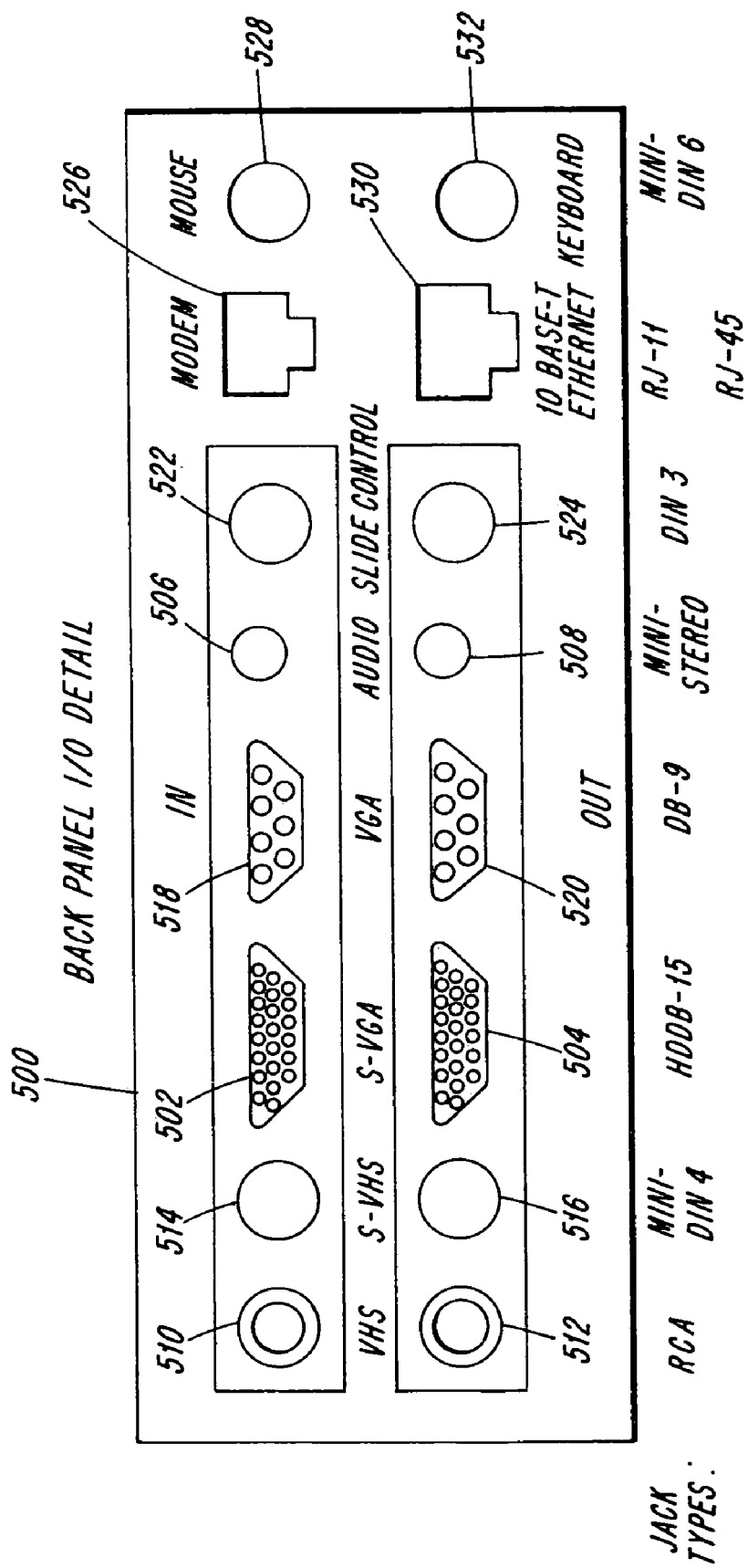
FIG. 5 shows input and output jacks on a system consistent with the present disclosure.

FIG. 5 shows, in detail, the ports contained on the back panel 500 of the integrated 35-mm slide projection unit 100 consistent with the present disclosure: SVGA-in 502, SVGA-out 502, VHS and SVHS in and out 510-516, Ethernet 530, modem 526, wired slide control in 522 and out 524, audio in 506 and out 508, keyboard 532 and mouse port 528. In addition, a power connection (not shown) is present.

Operation

Generally, three modes of operation will be discussed consistent with the present disclosure. These modes include: (1) lecture-capture mode, (2) lecture enhancement mode, and (3) Web-publishing mode.

(1) Capturing Lectures

Figure 6:
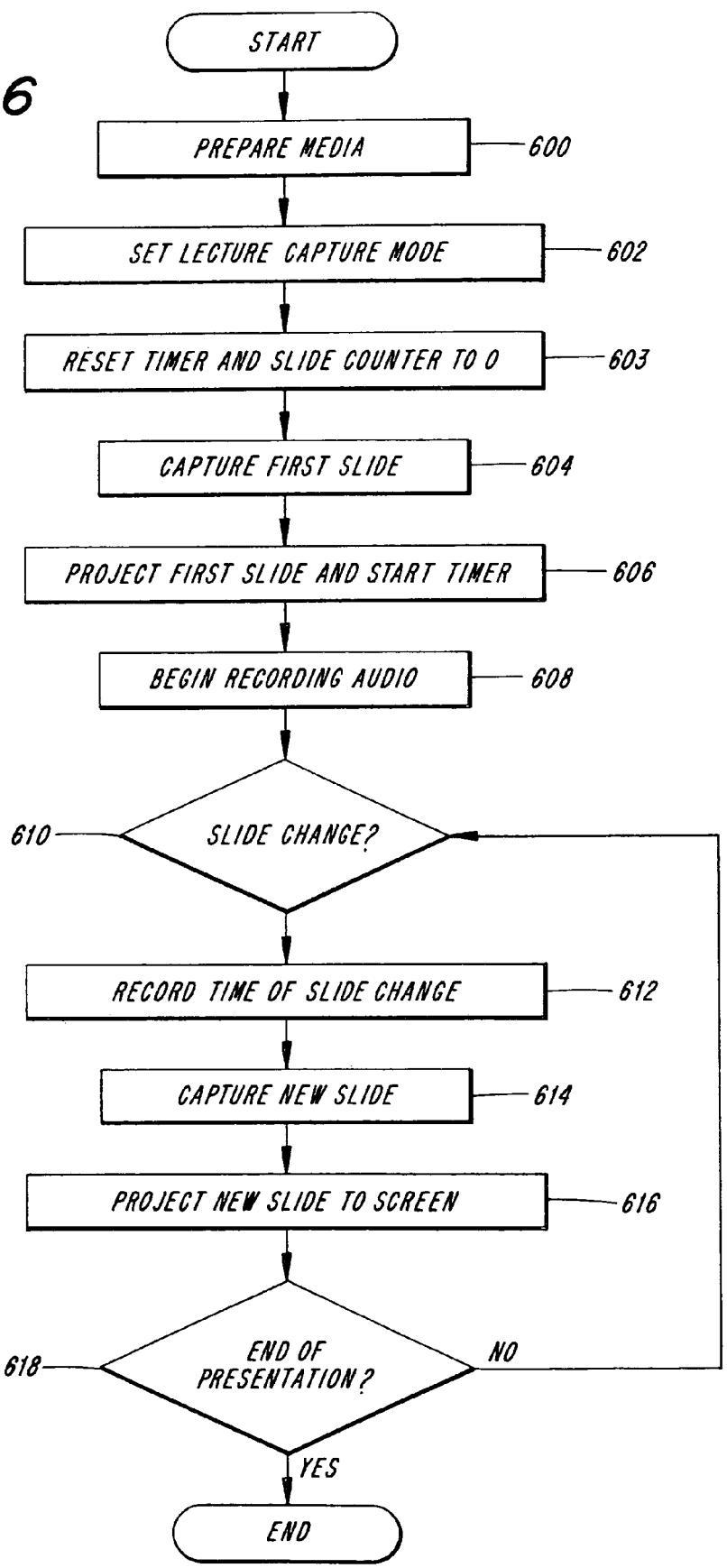
FIG. 6 is a flowchart illustrating a method for capturing a lecture consistent with the present disclosure.

FIG. 6 depicts a flowchart illustrating a method for capturing a lecture consistent with the present disclosure. This lecture-capture mode can be used to capture lecture content in a format that is ready for publishing on the Internet. The system can create data from the slides, audio and timer, and save them in files referred to as "source files."

At the beginning of a lecture, a presenter prepares the media of choice (step 600). If using 35-mm slides, the slide carousel is loaded into the tray on the top of the projector 100. If using a computer generated presentation, the presenter connects the slide-generating computer to the SVGA input port 502 shown in the I/O ports 500 of a projection unit 100. If using overhead transparencies or paper documents, the presenter connects the output of a multi-media projector 400 (such as the Toshiba MediaStar described above and shown in FIG. 4) to the SVGA input port 502. A microphone 116 is connected to the audio input port 506, and an Ethernet networking cable 122 is attached between the computer 102 and a network outlet in the lecture room. For ease of the discussion to follow, any of the above projected media will be referred to as "slides."

At this point, the presenter places the system into "lecture-capture" mode (step 602). In one implementation, a keyboard 108 or switch (not shown) can be used to set the lecture-capture mode. When this mode is set, the computer 102 can create a directory or folder on the secondary storage device 310 with a unique name to hold source files for this particular lecture. The initiation of the lecture-capture mode can also reset the timer and slide counter to zero (step 603). In one implementation, three directories or folders can be created to hold the slides, audio and time stamp information. Initiation of lecture-capture mode can also cause an immediate capture of a first slide using the mirror assembly 204 (step 604), for instance. The mirror assembly 204 flips to divert the light path from the projector to the CCD 206 of the digital camera. Upon capturing the first slide, the digital image can be stored in an image format, such as a JPEG format graphics file (a Web standard graphics format), in a slides directory on the secondary storage device 310 of the computer 102 (e.g., slides/slide01.jpg). After the capturing of the image by the CCD 206, the mirror assembly 204 flips back to allow the light path to project onto the projection screen 114. The first slide is then projected to the projection screen 114, and the internal timer 308 on the computer 102 begins counting (step 606).

Next, the audio of the lecture can be recorded through the microphone 116 and the audio signal can be passed to the audio capture card 304 installed in the computer 102 (step 608). The audio capture card 304 converts the analog signal into a digital signal that can be stored as a file on the computer 102. When the lecture is completed, this audio file can be converted into a streaming media format, such as Active Streaming Format or RealAudio format, for efficient Internet publishing. In one implementation, the audio signal can be encoded into the Active Streaming Format or RealAudio format in real time as it arrives and placed in a file in a directory on the secondary storage device 310. Although this implementation might require additional hardware (e.g., an upgraded audio card), it avoids conversion of the original audio file into Internet formats after the lecture is complete. Regardless, the original audio file (i.e., unencoded for streaming) can be retained as a backup on the secondary storage device 310.

When the presenter changes a slide (step 610) using the slide control 118 or by changing the transparency or document, the computer 102 can increment the slide counter by one and record the exact time of this change in an ASCII file (a computer platform and application independent text format), referred to as a "time-stamp file," written on the secondary storage device 310 (step 512). This file can have, for example, two columns, one denoting the slide number and the other denoting the slide change time. In one implementation, the file is stored in the time-stamp folder.

Using the mirror assembly 204 (FIG. 2), a new slide can be captured into a JPEG format graphics file (e.g., "slide#.jpg," where # is the slide number) that can be stored in the slides folder on the secondary storage device 310. When the new slide is captured, the mirror assembly 204 quickly diverts the light from the slide image back to the projection screen 114 (step 616). If any additional slides are presented, these slides can be handled in the same manner (step 618), and for each additional slide, the system can record the slide change time and capture the new slide in the JPEG graphics file format.

At the completion of the lecture, the presenter, or someone else, can stop the "lecture-capture" mode with the keyboard 108. This action stops the timer and completes the lecture capturing process.

2) Enhancing Lecture Content

Figure 7:
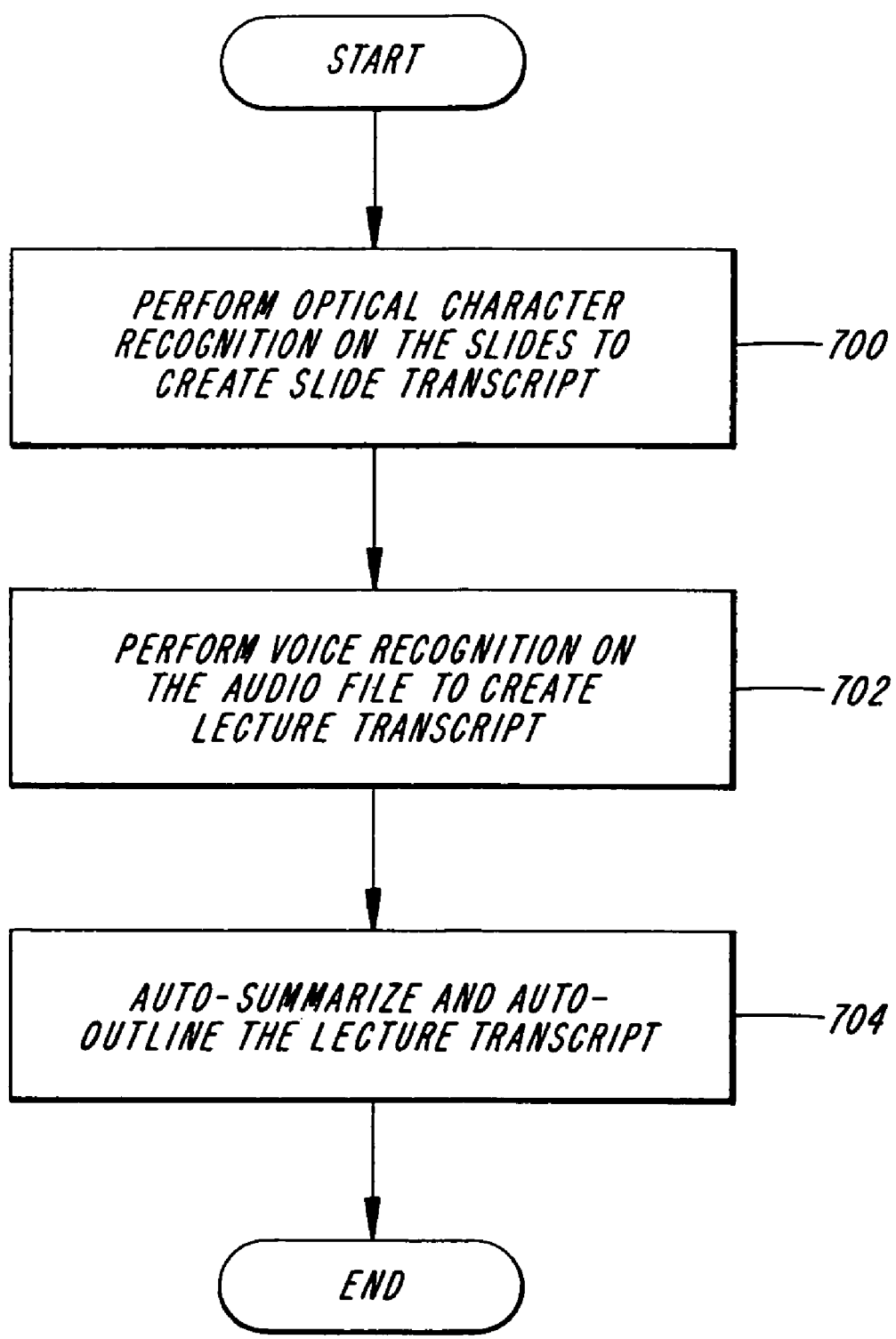
FIG. 7 is a flowchart illustrating a method for enhancing, a captured lecture consistent with the present disclosure.

FIG. 7 depicts a flowchart illustrating a method for enhancing a captured lecture consistent with the present disclosure. In one implementation, the "lecture enhancement mode" is entered when the lecture is complete, or contemporaneous with continued capture of additional lecture content, and the system has all or an initial set of the source files described above. In this mode, the system can create transcripts of the content of the slides and the lecture, and can automatically categorize and outline these transcripts. Additionally, the slide image data files may be edited as well, for example, to remove unnecessary slides or enhance picture quality.

Initially, optical character recognition (OCR) can be performed on the content of the slides (step 700). OCR converts the text on the digital images captured by the CCD 206 (digital camera) into fully searchable and editable text documents. The performance of the optical character recognition may be implemented by OCR software on the computer 102. In one implementation, these text documents can be stored as a standard ASCII file. Through the use of the time-stamp file, this file can be chronologically associated with slide image data. Further, Closed Caption data (if present) can be read from an input video stream and used to augment the indexing, search and retrieval of the lecture materials. A software based approach to interpreting Closed Caption data is available from Leap Frog Productions (San Jose, Calif.) on the World Wide Web. In addition, data from native presentation materials can further augment the capability of the system to search and retrieve information from the lectures. Metadata, including the presenter's name, affiliation, time of the presentation and other logistical information can also be used to augment the display, search and retrieval of the lecture materials. This metadata can be formatted in XML (Extensible Markup Language) and can further enhance the system through compliance with emerging distance learning standards, such as Shareable Courseware Object Reference Model Initiative (SCORM). Documentation regarding distance learning standards can be found at, among other websites, elearningforum.com on the World Wide Web.

Similarly, voice recognition can be performed on the audio file to create a transcript of the lecture speech, and the transcript can be stored as an ASCII file along with time-stamp information (step 702). The system can also provide a system administrator the capability to edit the digital audio files so as to remove caps or improve the quality of the audio using products such as WaveConvertPro (Waves, Ltd., Knoxville, Tenn.).

Content categorization and outlining of the lecture transcripts can be performed by the computer 102 using a software package such as LinguistX™ from InXight of Palo Alto, Calif. (step 704). The resulting information can be stored as an ASCII file along with time-stamp information.

3) Web Publishing

Figure 8:
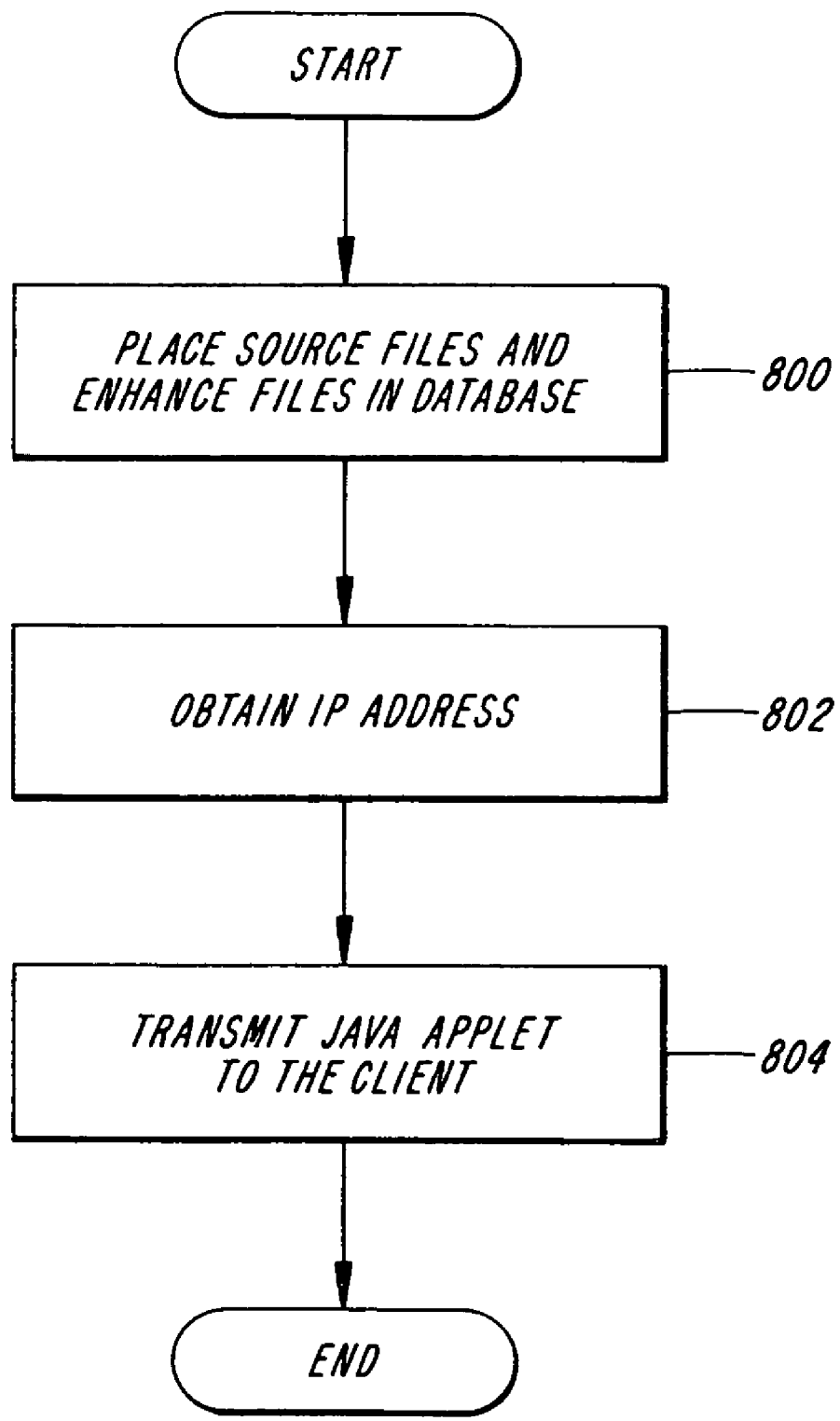
FIG. 8 is a flowchart illustrating a method for publishing a captured lecture on the Internet consistent with the present disclosure.

FIG. 8 is a flowchart illustrating a method for publishing a captured lecture on the Internet consistent with the present disclosure. After lecture capture or enhancement (step 800), the system may be set to "Web-publishing mode." It should be noted that the enhancement of the lecture files is not a necessary process before the Web-publishing mode but simply an optimization. Also, note that for the Web-publishing mode to operate, a live Ethernet port that is Internet accessible should be connected using the current exemplary technology. Standard Internet protocols (i.e., TCP/IP) can be used for networking. In this mode, all of the source files generated in the lecture-capture mode, as well as the content produced in the enhancement mode, can be placed in database 318 (step 800). Two types of databases may be utilized: relational and object oriented. Each of these types of databases is described in more detail below.

Consistent with the present disclosure, the system can obtain a temporary "IP" (Internet Protocol) address from a local server on the network node to which the system is connected (step 802). The IP address may be displayed on the LCD panel display 106.

When a user accesses this IP address from a remote Web-browser, the system (the "server") can transmit a Java applet to the Web-browser (the "client") via the HTTP protocol, a standard Internet method used for transmitting Web pages and Java applets (step 804). The transmitted Java applet provides a platform-independent front-end interface on the client side. The front-end interface is described below in detail. Generally, this interface can enable the client to view all of the lecture content, including the slides, audio, transcripts and outlines. This information can be fully searchable and indexed by topic (such as a traditional table of contents), by word (such as a traditional index in the back of a book), and by time-stamp information (denoting when slide changes occurred).

The lecture data source files stored on the secondary storage device 310 can be immediately served to the Internet as described above. In addition, in one implementation, the source files may optionally be transferred to external Web servers. These source files can be transferred via FTP (File Transfer Protocol), again using standard TCP/IP networking, to any other computer connected to the Internet. The source files can then be served as traditional HTTP Web pages or served using the Java applet structure discussed above, thus allowing flexibility of use of the multimedia content.

Use of the Captured Lecture and the Front-End Interface

The end-user of a system consistent with the present disclosure can navigate rapidly through the lecture information using a Java applet front-end interface. This platform-independent interface can be accessed from traditional PCs with a Java-enabled Web-browser (such as Netscape Navigator™ and Microsoft Internet Explorer™) as well as Java-enabled Network Computers (NCs).

Figure 9:
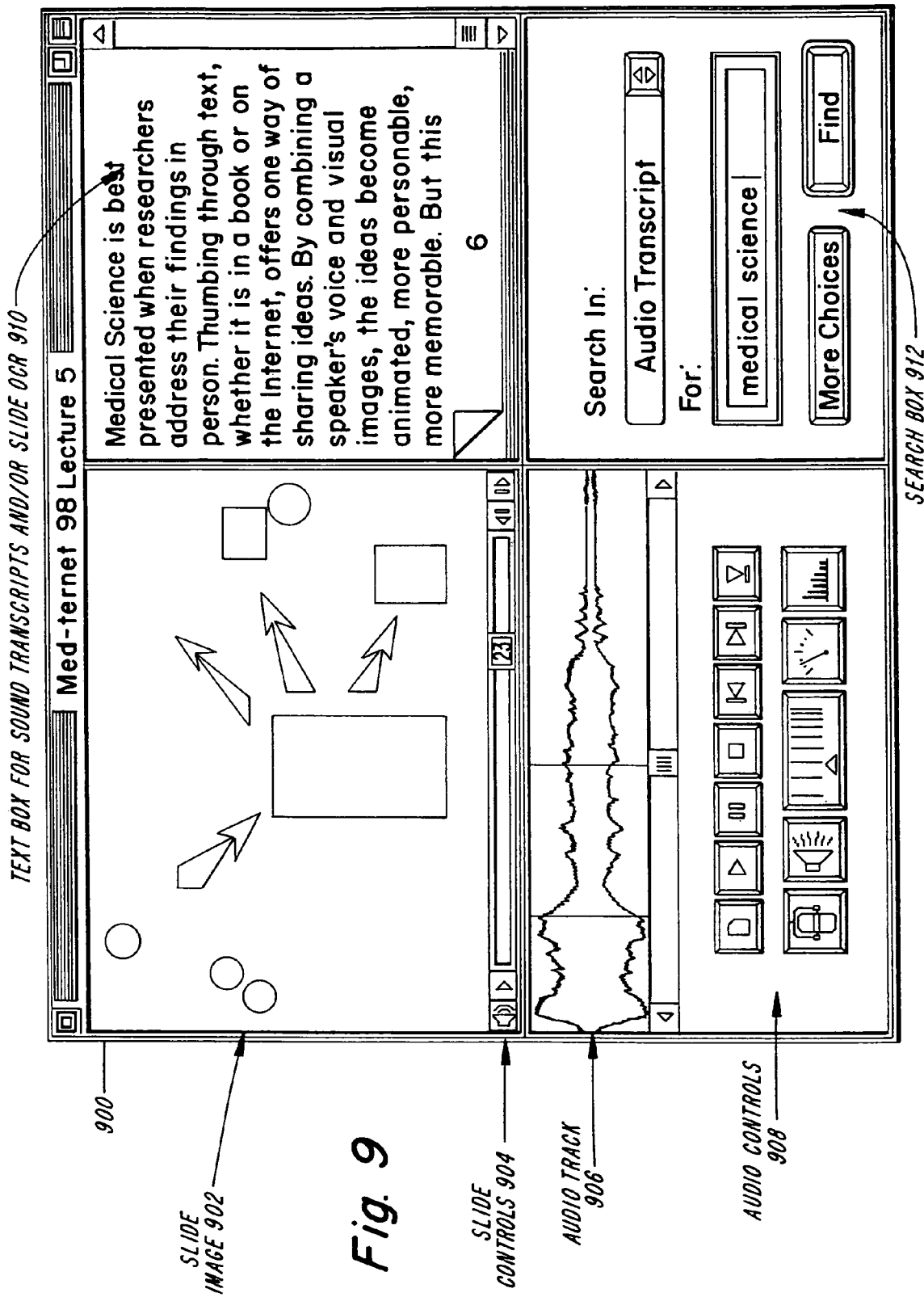
FIG. 9 shows an example of a front-end interface used to access the database information consistent with the present disclosure.

FIG. 9 shows a front-end interface 900 consistent with the present disclosure. The front-end interface can provide a robust and platform-independent method of viewing the lecture content and performing searches of the lecture information. In one implementation, the interface includes a main window divided into four frames. One frame can show the current slide 902 and contain controls for the slides 904, another frame can show the audio controls 908 with time information 906, and a third frame can show the transcript of the lecture 910 and scroll to follow the audio. The fourth frame can contain a dialog box in which the user can enter search terms 912, a pop-up menu with which the user can select types of media they wish to search, and a button that initiates the search. Examples of search methodologies include chronological, voice transcript, slide transcript, slide number, and keyword, among others. The results of the search can be provided in the first three frames showing the slides, the audio and the transcripts. In another implementation consistent with the present disclosure, another window can be produced which shows other relevant information, such as related abstracts.

Description of the Database Structure

Before the source files generated in the lecture capturing process can be published in a manner that facilitates intelligent searching, indexes to the source files should be stored in a database. The database can maintain links between all source files and searchable information such as keywords, author names, keywords in transcripts, and other information related to the lectures.

Two methods for organizing a database that contains multiple types of media (text, graphics and audio) include object-oriented and relational. An object-oriented database links together the different media elements, and each object contains methods that allow that particular object to interact with a front-end interface. Any type of media can be placed into the object-oriented database, as long as methods of how this media is to be indexed, sorted and searched are incorporated into the object description of the media.

The second method involving a relational database provides links directly to the media files, instead of placing them into objects. These links determine which media elements are related to each other (i.e., they are responsible for synchronizing the related audio and slide data).

Figure 10:
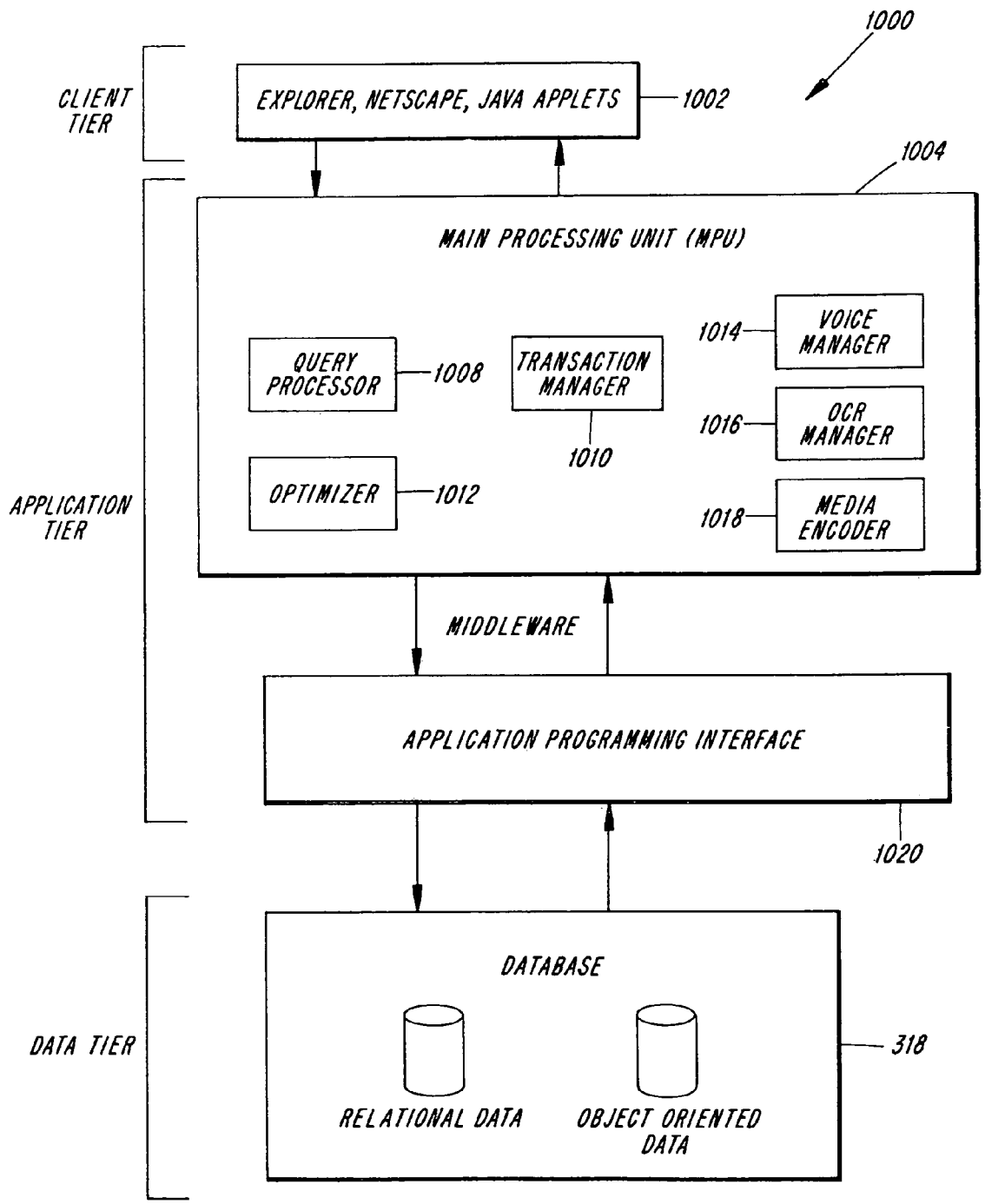
FIG. 10 shows a schematic of a three-tier architecture consistent with the present disclosure.

FIG. 10 shows a schematic of an exemplary three-tier architecture 1000 that can be used to store and serve the multimedia content to the end-user. As shown in FIG. 10, the database 318 can include part of the three-tier architecture 1000. The database 318 (labeled as the "data tier") can be controlled by an intermediate layer instead of directly by the end-user's interface 1002 (labeled as the "client tier"). The client is a computer running a Web-browser connected to the Internet. The intermediate layer, labeled as the "application tier," can provide scalability (i.e., more servers can be added without bringing down the application tier), queuing (i.e., requests from the client can be queued at the application tier so that they do not overload the database 318), and increased compatibility. Although the application tier and front-end are Java based, the database 318 can communicate with the application tier in any manner which maximizes performance. The method of communication, protocols used, and types of databases utilized do not affect the communication between the business logic and the front-end.

FIG. 10 also shows how the application tier includes a Main Processing Unit (MPU) 1004 and middleware 1020. On the MPU 1004 can reside the custom Java code that controls query processing 1008, manages transactions 1010 and optimizes data 1012. Additionally, this code can perform OCR 1014 and voice recognition 1016 and encode the media 1018. The middleware 1020 can provide a link between the custom Java code and the database 318. This middleware 1020 is presently available as various media application programming interfaces (APIs) developed by Sun Microsystems, Microsoft, and others. The middleware 1020 can abstract the custom Java code from the database 318.

The end-user or client can interact with the MPU 1004 within the application tier. In addition, information entering the database 318 from the "lecture-capture mode" of the system can enter at the application tier level as well. This information can then be processed within the MPU 1004, passed through the middleware 1020, and populate the database 318.

Further Embodiments

There are many different methods of implementing a system that performs functions consistent with the present disclosure. Several embodiments are described below.

1) Separation of the Mirror Assembly from the Projection Device and Computer

Figure 11:
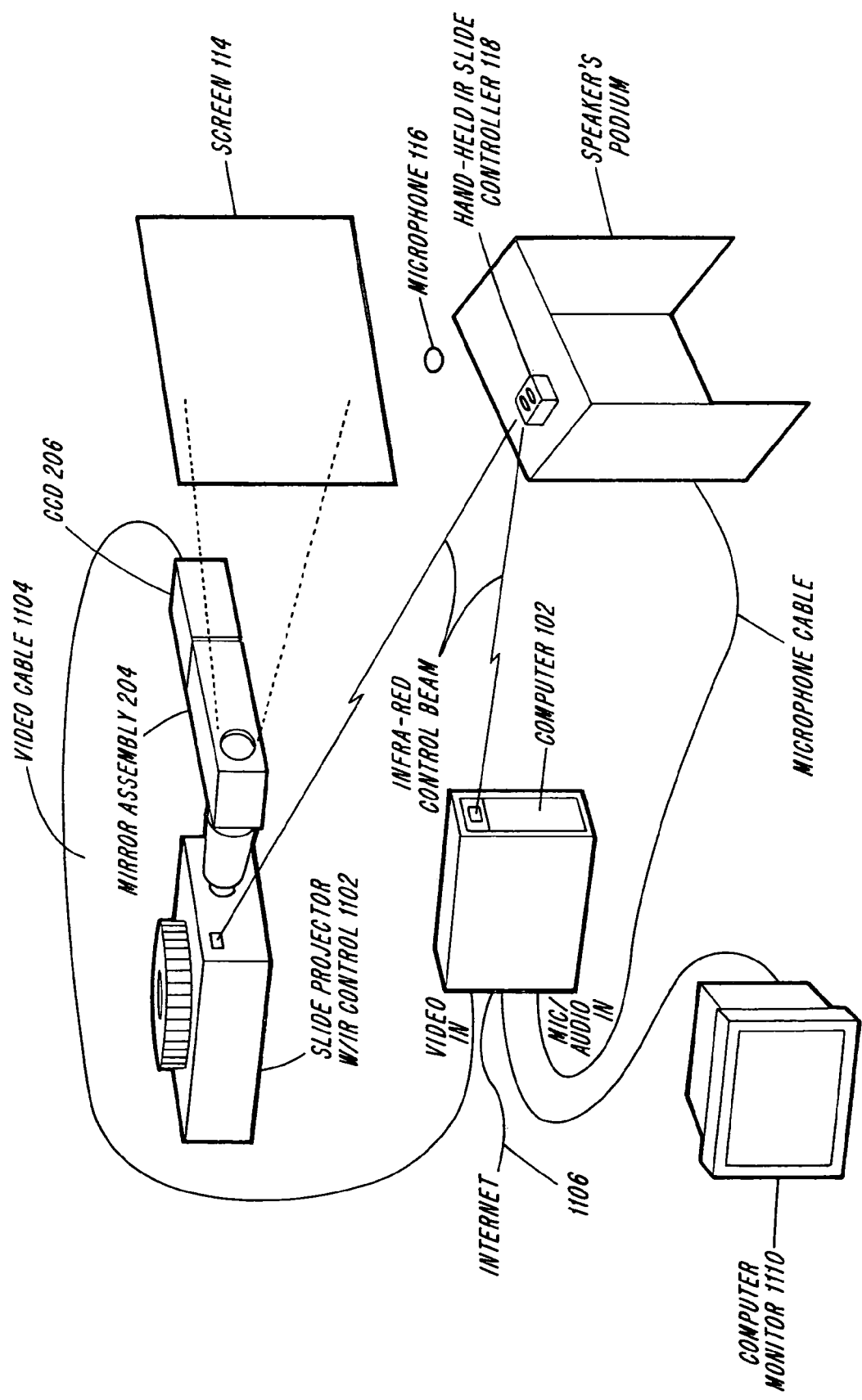
FIG. 11 shows an alternative implementation consistent with the present disclosure in which the projection device is separate from the lecture capture hardware.

FIG. 11 depicts a lower-cost and more modular way of providing the lecture-capturing functionality involving the separation of the mirror assembly 204 and CCD 206 from the projection device. In this embodiment, the mirror assembly 204 and CCD 206 can be incorporated into a separate unit that snaps onto the lens of the 35-mm slide projector 1102. As shown in FIG. 11, the mirror assembly 204 and CCD 206 is connected by video cable 1104 to the computer 102, which sits in a separate box. This connection allows the computer 102 to receive digital video image data from the CCD 206 and to control the action of the mirror 204 via the solenoid 202 (shown in FIG. 2). The infrared (IR) beam from the slide controller 118 signals a slide change to both the slide projector 1102 and the computer 102. Both the infrared sensors on both devices are configured to receive the same IR signal so that the slide controller 118 can control both devices. For instance, the slide projector 1102 may be purchased with a slide controller 118, in which case the slide projector 1102 will already be tuned to the same IR frequency as the slide controller 118. An infrared sensor in the computer 102 may be built or configured to receive the same IR frequency emitted by the slide controller 118. Such configuration of an IR sensor tuned to a particular frequency is well known to those skilled in the art. Additionally, a computer monitor 1110 can be used in place of the LCD display on a single unit. A laptop computer, of course, can be used instead of the personal computer shown. This modular setup can provide an advantage, in certain implementations, in that once the appropriate software is installed, the user can use any computer and projection device desired, instead of having them provided in the lecture-capturing box described above.

For capturing computer-generated presentations, the mirror assembly is not used and the video signal and mouse actions from the user's slide-generating computer pass through the capture computer before going to the LCD projector. This configuration enables the capture computer to record the slides and change times.

Figure 12:
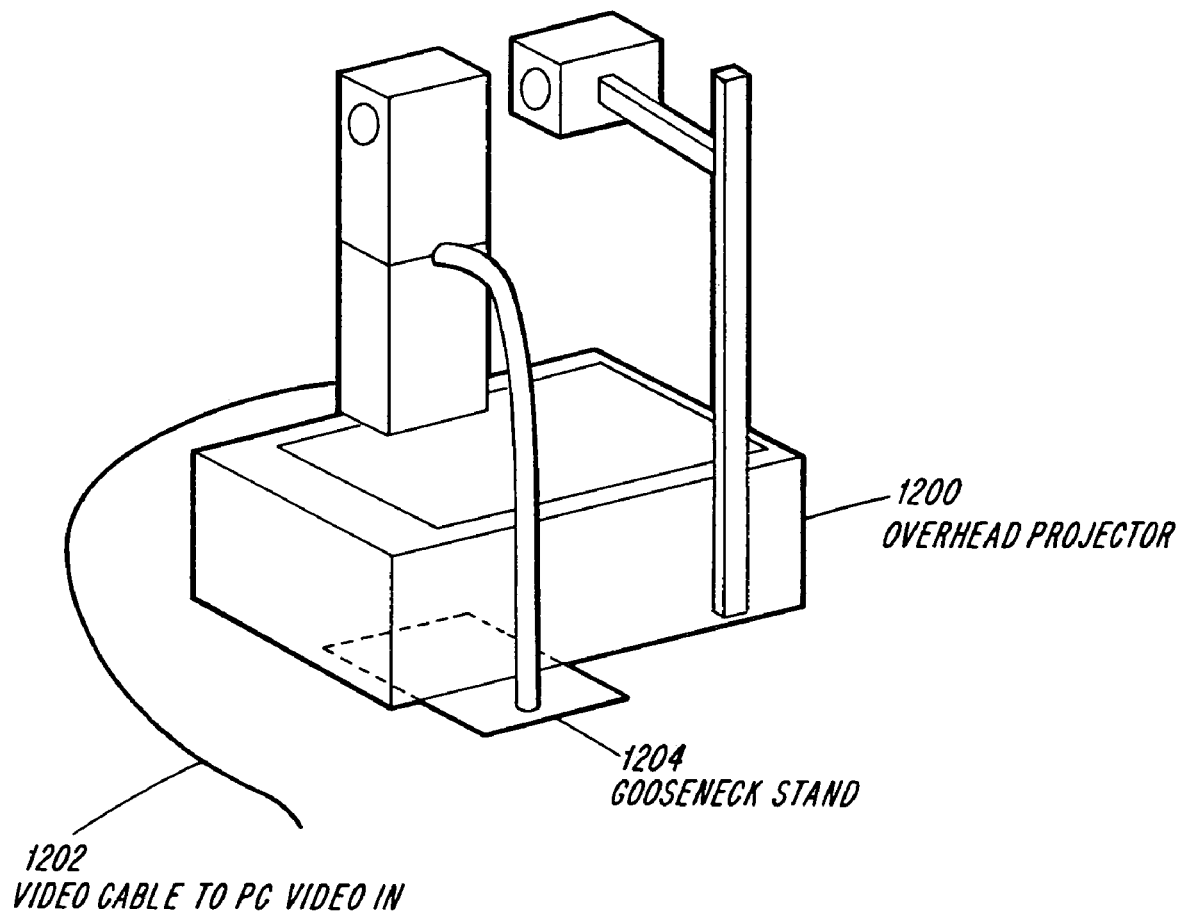
FIG. 12 shows alternate connections to an overhead projector with a mirror assembly consistent with the present disclosure.

FIG. 12 shows another implementation using the connection of a separate CCD 206 and mirror assembly 204, described above, to a standard overhead projector 1200 for the capture of overhead transparencies. A video cable 1202 passes the information from the CCD 206 to the computer 27. A gooseneck stand 1204 holds the CCD 206 and mirror assembly 204 in front of the overhead projector 1200.

2) Slide Capture Trigger

With the use of a Kodak Ektapro Slide Projector (Kodak, Rochester, N.Y.), which can either be incorporated into device 100 or used as a stand-alone slide projector 1102, another method of communicating the status of the slide projector to the computer 102 can use the P-Com protocol (Kodak, Rochester, N.Y.). The P-Com protocol is communicated between the slide projector and the computer 102 over an RS-232 interface that is built into the Ektapro projector. The information obtained from the projector can provide the computer 102 with the data signaling that a slide change has occurred whereupon the computer can then digitally capture the slide.

This approach alleviates the need for detecting signals from the infrared controller 118 and IR sensor 104 or the wired slide controller.

3) Front-End Interfaces

Although the front-end interface described above is Java-based, if the various modes of operation are separated, other front-end interfaces can be employed. For example, if lecture-capture is handled by a separate device, its output is the source files. In this case, these source files can be transferred to a separate computer and served to the Internet as a website including standard HTML files, for example.

In another implementation, the front-end interface can also be a consumer-level box which includes a speaker, a small LCD screen, several buttons used to start and stop the lecture information, a processor used to stream the information, and a network or telephone connection. This box can approach the size and utility of a telephone answering machine but can provide lecture content instead of just an audio message. In this implementation, the lecture content can be streamed to such a device through either a standard telephone line (via a built-in modem for example) or through a network (such as a cable modem or ISDN). Nortel (Santa Clara, Calif.) provides a "Java phone" which can be used for this purpose.

4) Application Tier Implementation

The system described in the Main Processing Unit (1004) and the Application Programming Interface (1020) can be programmed using a language other than Java, e.g., C, C++ and/or Visual Basic Languages.

5) Optical Assembly for Image Capture

Another implementation of the present disclosure can replace the mirror assembly 204 with a beam splitter (not shown). This beam splitter allows for slide capture at any time without interruption, but reduces the intensity of the light that reaches both the digital camera and the projection screen 114. If a beam splitter is used, redundancies can be implemented in the slide-capturing stage by capturing the displayed slide or transparency, for example, every 10 seconds regardless of the slide change information. This approach can help overcome any errors in an automated slide change detection algorithm and allow for transparencies that have been moved or otherwise adjusted to be recaptured. At the end of the lecture, the presenter can select from several captures of the same slide or transparencies and decide which one should be kept.

System Diagnosis

In one implementation consistent with the present disclosure, the user can connect a keyboard and a mouse, along with an external monitor, to the SVGA-out port 504. This connection can allow the user access to the internal computer 102 for software upgrades, maintenance, and other low-level computer functions. Note that the output of the computer 102 can be directed to either the LCD projection device or the LCD panel 106.

Wireless Communications

In one implementation consistent with the present disclosure, the network connection between the computer and the Internet can be made using wireless technology. For example, a 900 MHZ connection (similar to that used by high quality cordless phones) can connect the computer 102 to a standard Ethernet wall outlet. Wireless LANs can also be used. Another implementation can use wireless cellular modems for the Internet connection.

Electronic Pointer

In another implementation, an electronic pointer can be added to the system. Laser pointers are traditionally used by presenters to highlight portions of their presentation as they speak. The movement of these pointers can be tracked and this information can be recorded and time-stamped. This approach can enable the end-user to search a presentation based on the movement of the pointer and have the audio and video portion of the lecture synchronized with the pointer.

Spatial positional pointers can also be used in the lecture-capture process. These trackers can allow the system to record the presenter's pointer movements in either 2-dimensional or 3-dimensional space. Devices such as the Ascension Technology Corporation pcBIRD™ or 6DOF Mouse™ (Burlington, Vt.), INSIDETRAK HP by Polhemus Incorporated (Colchester, Vt.), or the Intersense IS 300 Tracker from Intersense (Cambridge, Mass.) can be used to provide the necessary tracking capability for the system, among others. These devices send coordinate (x, y, z) data through an RS-232 or PCI interface, which communicates with the CPU 306, and this data is time-stamped by the timer 308.

Separation into Different Units

In one embodiment consistent with the present disclosure, the system can be separated into several physical units, one for each mode or a subset combination of modes (i.e., lecture capture, enhancement and publishing). A first physical unit can include the projection device and computer that contains all of the necessary hardware to perform the lecture-capturing process. This hardware can include the mirror assembly, the CCD digital camera, if this embodiment is used, a computer with video and audio capturing ability, an infrared sensing unit, and networking ability. In this implementation, the function of the first physical unit is to capture the lecture and create the source files on the secondary storage of the unit. This capture device contains the projection optics and can display one or more of 35-mm slides, a computer generated presentation, overhead transparencies and paper documents.

In this implementation, the lecture enhancement activities can be performed in a second separate physical enclosure. This separate device contains a computer with networking ability that can perform the OCR, voice recognition and auto-summarization of the source files generated in the lecture-capturing process.

Finally, a third physical enclosure can provide Web-publishing function and contain a computer with network ability, a database structure and Internet serving software. The second and third functions can be combined in one physical unit, the first and third functions can be combined in one physical unit or the first and second functions can be combined in one physical unit, as circumstances dictate.

In this modular design, several categories of products can be implemented. For example, one implementation can provide lecture capturing ability only, and require only the lecture-capturing devices. This system would be responsible for the creation and serving of the generated source files. Another implementation can provide lecture capturing and Web serving, and only require the lecture-capturing devices and the Web-publishing devices. Yet another implementation can add the lecture-enhancement device to the above configurations, and also provide the lecture transcripts and summaries to the Web. In addition to the modularization of the different tasks as described above, modularization with respect to physical components (different products), with distributed task functions, can be achieved. For instance, several lecture capture units can be networked or otherwise connected to a centralized enhancement and publishing, or just publishing unit.

Electronic Capture Embodiments

The modular approach can facilitate additional embodiments where the presentation is developed, at least regarding the slides, as a computer-generated presentation using available software such as PowerPoint®, etc. In these embodiments, a chip set, such as that made available from PixelWorks and other companies, can be employed to enable auto-detection of the video signal and also to provide digitization of the signal in a means which is appropriate to the resolution and aspect ratio and signal type (video vs. data). The CPU and the digitization circuitry can be provided on a single chip along with a real-time operating system and Web-browser capability, or on separate chips. Four embodiments with varying degrees of modularity and functionality are described below. Furthermore, PixelWorks offers chip sets which provide a system on a chip by incorporating a Toshiba general purpose microprocessor, an ArTile TX79, on the same chip as the video processing circuits (pixelworks.com/press on the World Wide Web). Leveraging the general purpose microprocessor, embodiments containing this or similar devices can be configured to perform the following functions:

- Control and/or communicate with external devices such as hard drives or other digital storage media using USB, Ethernet and or IEEE 1394 connectivity.
- Execute software which can either read file formats (such as Microsoft PowerPoint®, Microsoft Word®, Internet browsers, etc.) which are commonly used in presentations.
- Execute software to read a file in an intermediate file format which may be a proprietary "transfer format," which is compatible with Microsoft PowerPoint®, Word, Internet browsers, and the like commonly used in presentations. Companies that produce such file translation software include DataViz (dataviz.com on the World Wide Web).
- Interpret data from an input stream (provided for example by IEEE 1394, USB, Ethernet, or Wireless network connectivity), allowing processing of data for either immediate display and/or storage in part or in whole for later viewing.

1) Projector Embodiment

Figure 13:
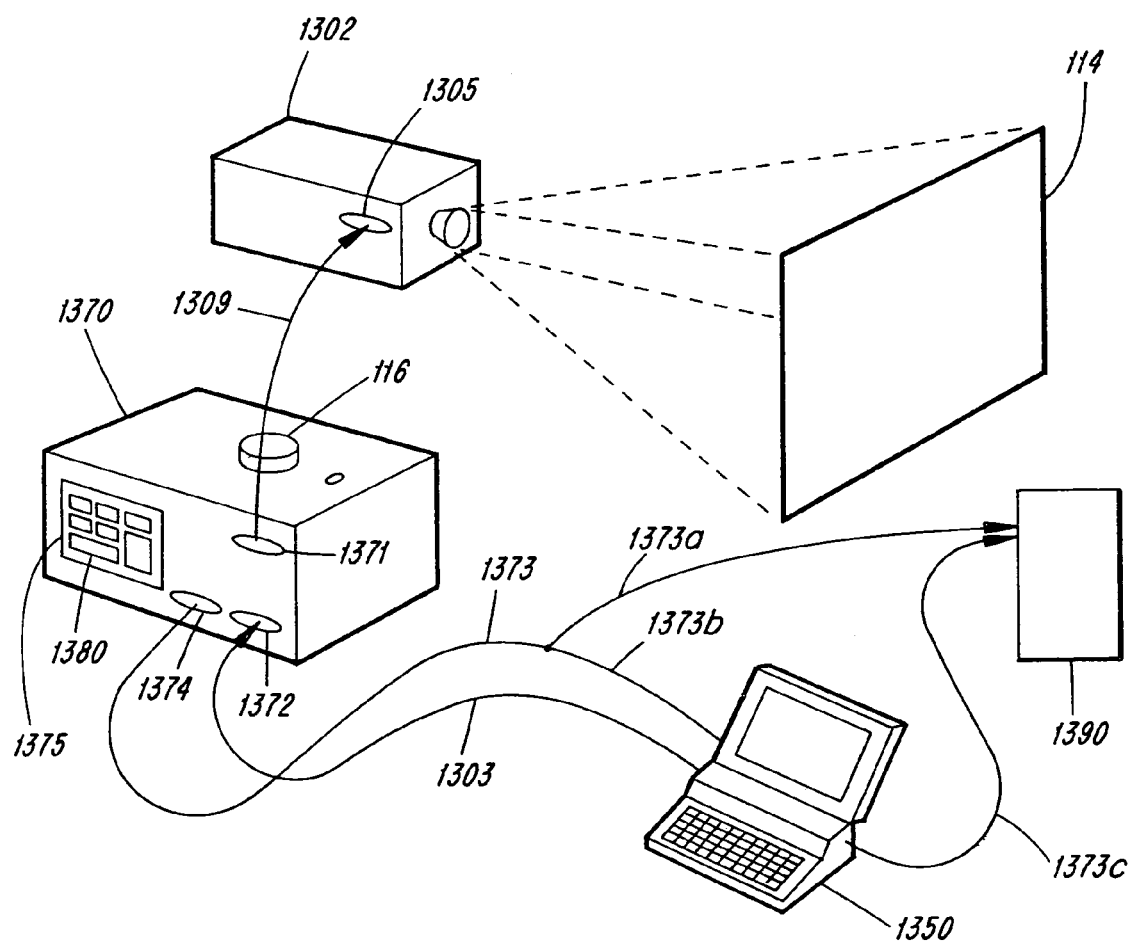
FIG. 13 depicts the components of a embodiment for capturing a live presentation where the images are computer generated.

The first of these embodiments, shown in FIG. 13 includes a standard image (e.g., slide and/or video) projector 1302 with an intermediary unit 1370 placed between the projector 1302 and the source of the projected images, e.g., a general purpose computer 1350. The intermediate unit 1370 can complete the media processing and contain either a USB port 1374 to communicate with the computer 1350 and possibly an analog modem and Ethernet to communicate directly with a server 1390. The projector 1302 associated with this embodiment can be any commercial or proprietary unit that is capable of receiving VGA, SVGA, XGA or SXGA and/or a DVI input, for instance. The input 1305 to the video projector is received via cable 1304 from the intermediate unit 1370 from an associated output port 1371. The intermediate unit 1370 receives its input at interface 1372 via cable 1303 from the general purpose computer 1350 or other computer used for generating the presentation. The intermediate unit 1370 can also contain an omni-directional microphone 116 and audio line input to be used concurrently or separately as desired by the user. The intermediate unit 1370 can function to capture the presentation through the computer generated slides, encode time-stamp information and capture the audio portion of the presentation. The captured data can then be stored in removable media 1380 or transferred via USB or other type of port from the intermediate units output 1372 by cable 1373b to the computer 1350. This aspect can eliminate the need for storage in the intermediate unit 1370 and can use more reliable flash memory. The computer 1350 or other type of computer can receive the processed media from the intermediate unit 1370 and transfer the data via cable 1373a to the Web-server through its connection to the net. Optionally, the intermediate unit 1370 can connect directly to the media server 1390 via cable 1373a, as described earlier.

The media server 1390 running standard media server software such as Apple Quicktime™, RealNetworks RealSystem Server™ or Microsoft Media Server, can stream the data with a high bandwidth connection to the Internet. This process can occur both as a simulcast of the lecture as well as in an archive mode with transfer occurring after the event has transpired. Such arrangement with the computer 1350 can eliminate the need for an Ethernet card and modem built into the intermediate unit 1370 since most general purpose computers already have this functionality.

Figure 14:
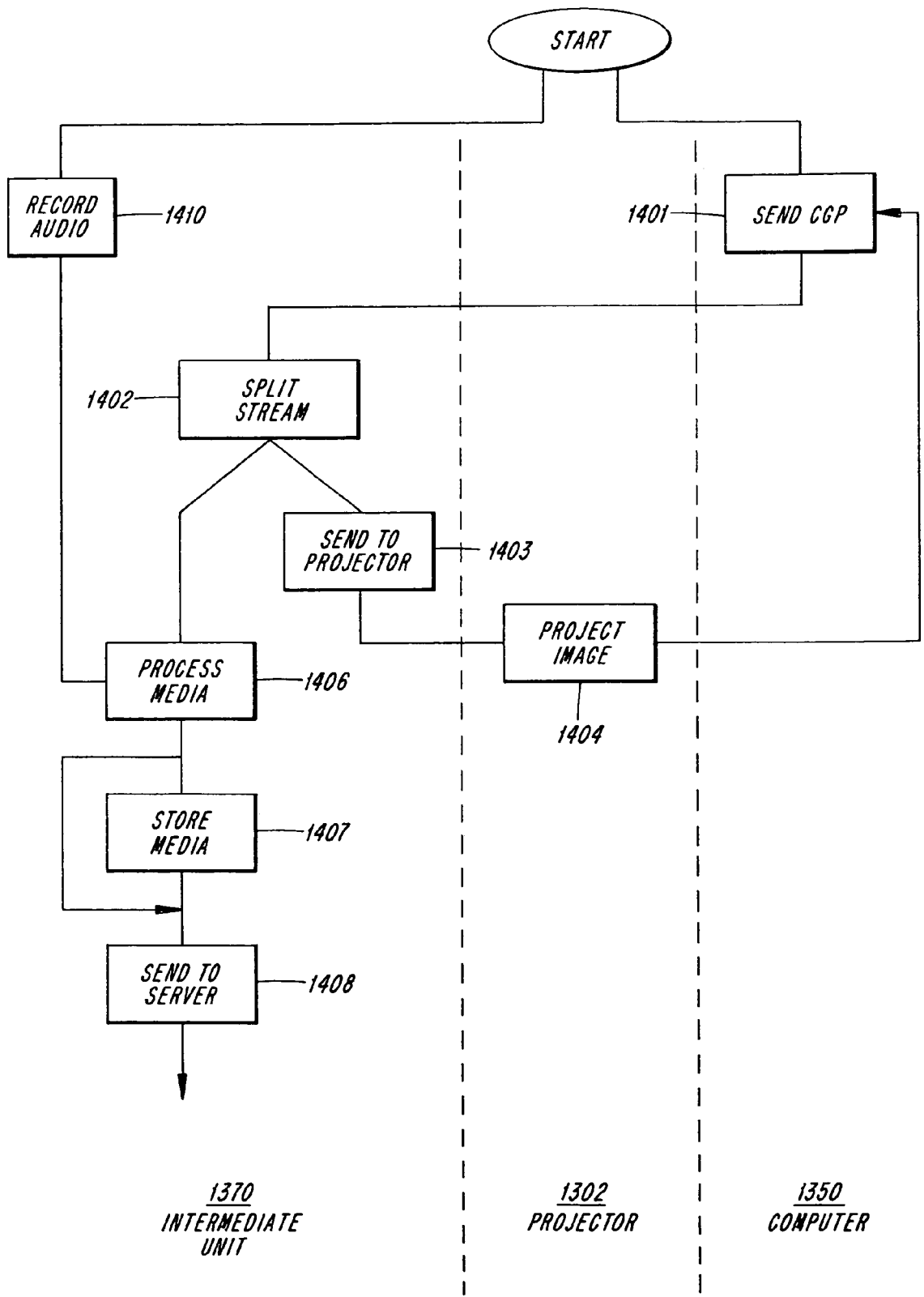
FIG. 14 is a flow chart illustrating a method for capturing a lecture consistent with an illustrated embodiment.

FIG. 14 shows a flow chart with each function arranged in an associated component, including a general purpose computer or other type of computer 1350, an image projector 1302 and an intermediate unit 1370. At the beginning of a presentation, the presenter can use the computer 1350 to send a computer generated presentation, i.e., an image or series of images or slides, to the intermediate unit 1370 in step 1401. Simultaneously with this process, the intermediate unit in step 1410 begins to record the audio portion of the live presentation. In step 1402, in the intermediate unit 1370, a signal containing the image is split into two signals, the first of which is processed with the recorded audio in step 1406 and is stored in step 1407 in the intermediate unit 1370, or alternatively sent directly to the server in step 1408. In step 1403, the second of the split signals is sent to the projector in step 1403, and is displayed by the projector 1302 in step 1404. The process begins again at step 1401 when the lecture sends a new computer generated image. The audio is recorded continuously until the presentation is complete.

In splitting the image signals sent from the personal computer 1350 at step 1401, the present embodiment can facilitate two different methods. In the first method using an image signal splitter (e.g., a Bayview 50-DIGI, see on the World Wide Web baytek.de/englisch/BayView50.htm), the image signal is split into a digital 24 bit RGB (red, green, blue) for media processing and an analog RGB image signal sent to the projector 1302. However, if the projector is capable of receiving digital RGB image signals, then an image signal splitter such as a Bayview AD1 can be used, which produces two digital outputs, one for processing and one for projection.

2) Digital Output Projector

While an objective is to employ a standard, non-customized computer 1350 to permit a presenter to use his own laptop, for instance, it is possible that the functions of the intermediate unit 1370 can be incorporated in the general purpose computer 1350 through software, firmware and hardware upgrades.

Figure 15:
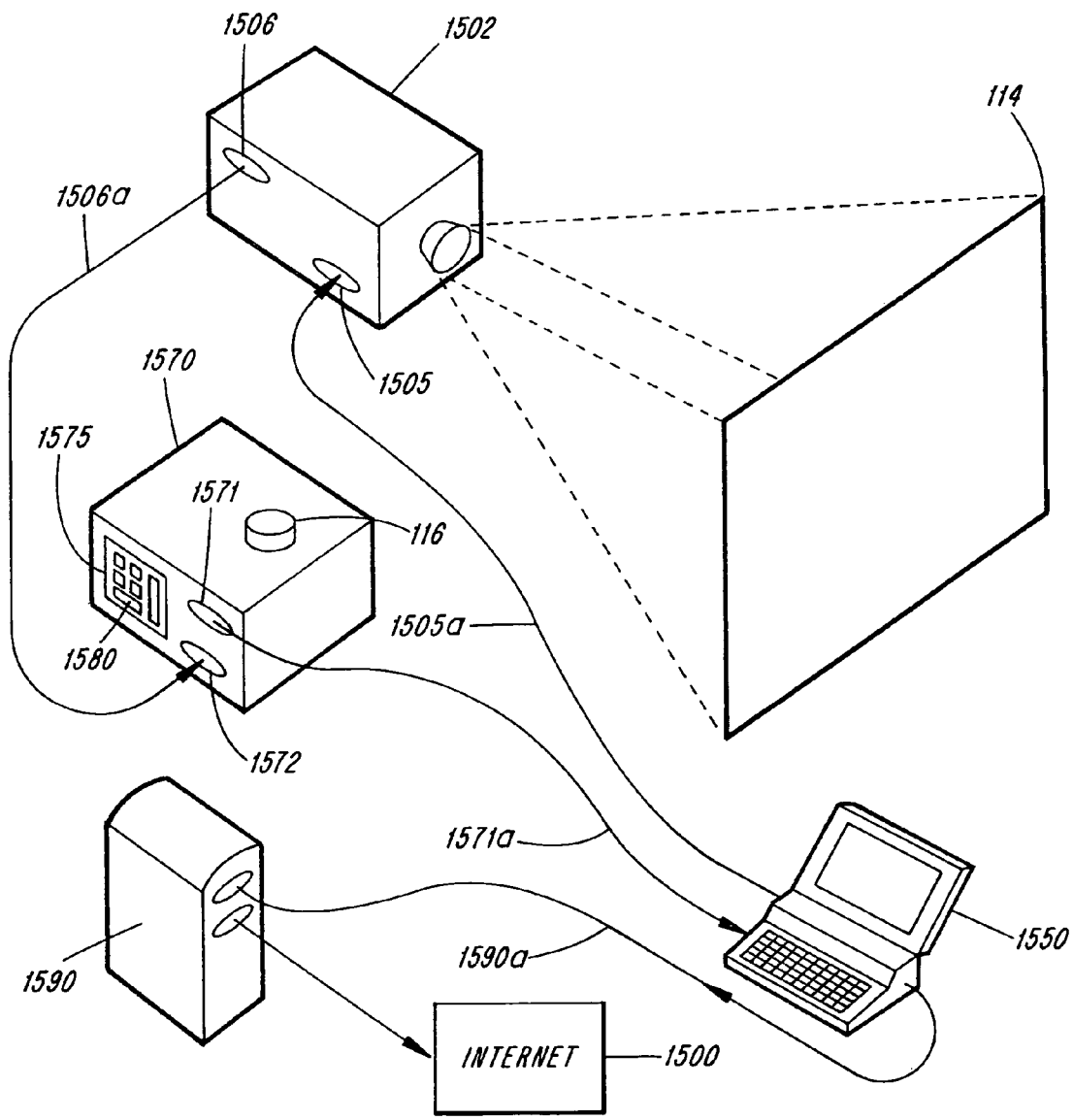
FIG. 15 depicts the components of another embodiment for use in capturing a live presentation in which the images are computer generated.

In a second embodiment, such as shown in FIG. 15 for use with computer generated presentations, an image projector 1502 can contain a digital output and formatting for output via USB or Firewire (IEEE 1394). A general purpose personal computer 1550 or other type of computer used for generating the presentation can supply the computer generated presentation to the projector 1502 through an input port 1505 via cable 1505a on the projector that has the capability of receiving VGA, SVGA, XGA or SXGA and/or a DVI input for instance. Through the USB or Firewire (IEEE 1394 interface) interface 1506, via cable 1505a, the projector 1502 can communicate with an intermediate unit 1570 at interface 1572, which can capture the computer generated presentation, as well as the audio portion of the presentation through an omni-directional microphone 116 and/or audio input. The output from the intermediary unit 1570 is in a raw media format and supplied to the general purpose computer 1550 via USB or Firewire interface 1571 and cable 1571a, where the raw media can be processed using custom software for media conversion and processing or custom hardware/software in the laptop computer. The media can be processed into HTML and/or streaming format via the software/hardware and supplied to the media server 1590 via cable 1590a, which in turn can stream the media with high bandwidth to the Internet 1500. This system utilizes the capabilities of the computer 1550 used in generating the presentation to process the media, with the addition of software or some custom hardware. The intermediate unit 1570 can also have a removable storage media 1580 and presentation capture controls 1575 capable of adjusting certain parameters associated with the lecture capture. However, the intermediate unit 1570 can be connected directly to the server 1590.

Figure 16:
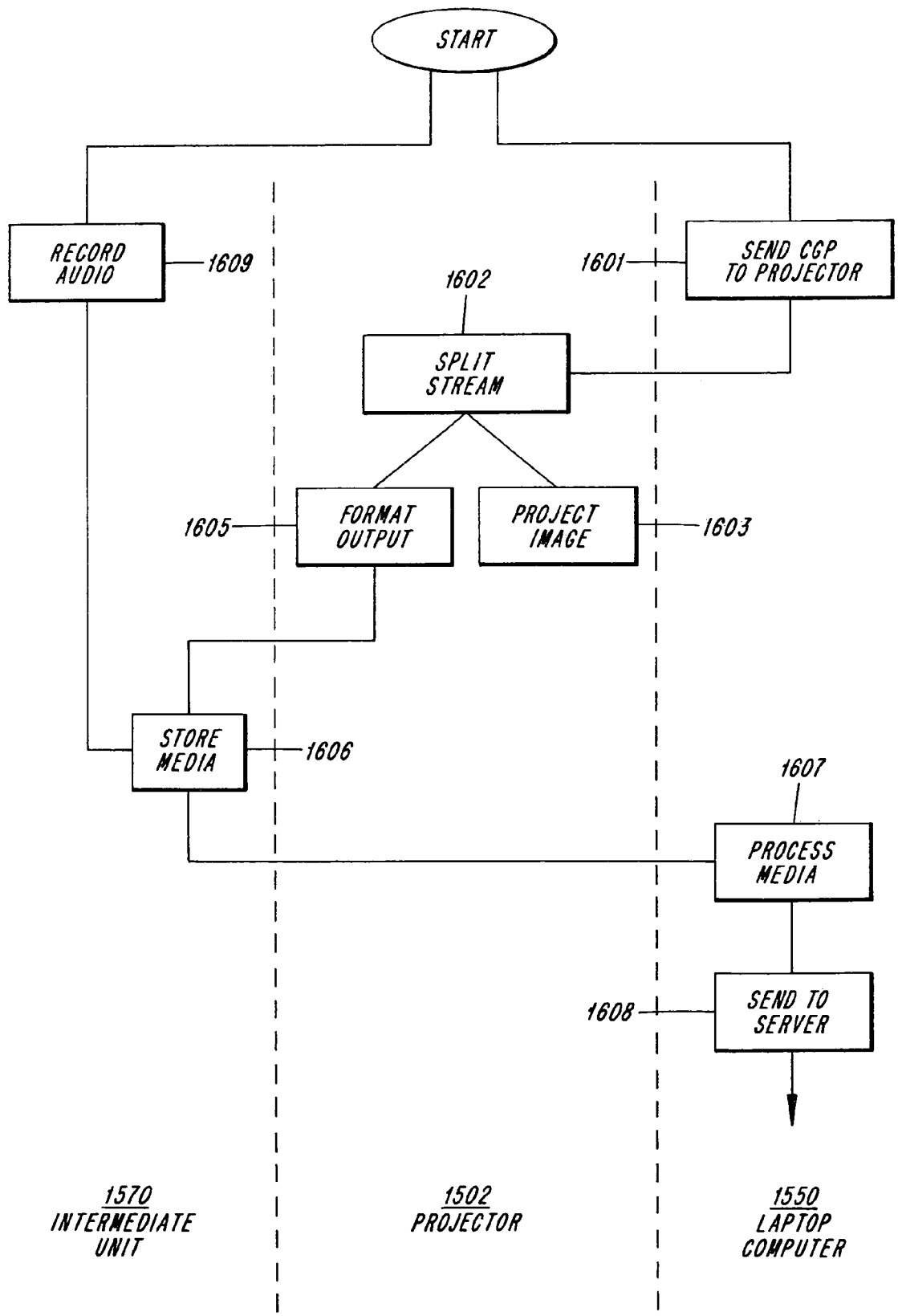
FIG. 16 is a flow chart illustrating a method for capturing a live presentation consistent with an illustrated embodiment.

FIG. 16 is a flow chart representing different functions and components of the lecture capturing system for the embodiment shown in FIG. 15 and discussed above. At the start, the presenter via the computer 1550 sends a computer generated presentation, e.g., images, to the projector at step 1601. As in the previous embodiment, the image signal is split at step 1602 into two image signals, the first of which is formatted, if necessary, to digital form which also can be carried out using the signal splitting components discussed above. The signal is then stored at step 1606, along with the audio portion of the live presentation which is recorded in step 1609. The raw data is then transferred back to the computer 1550 for media processing in step 1607 where synchronization of the recorded audio portion and the images is also accomplished. The formatted information is then sent to a server in step 1608.

3) Projector with Media Processor

Figure 17:
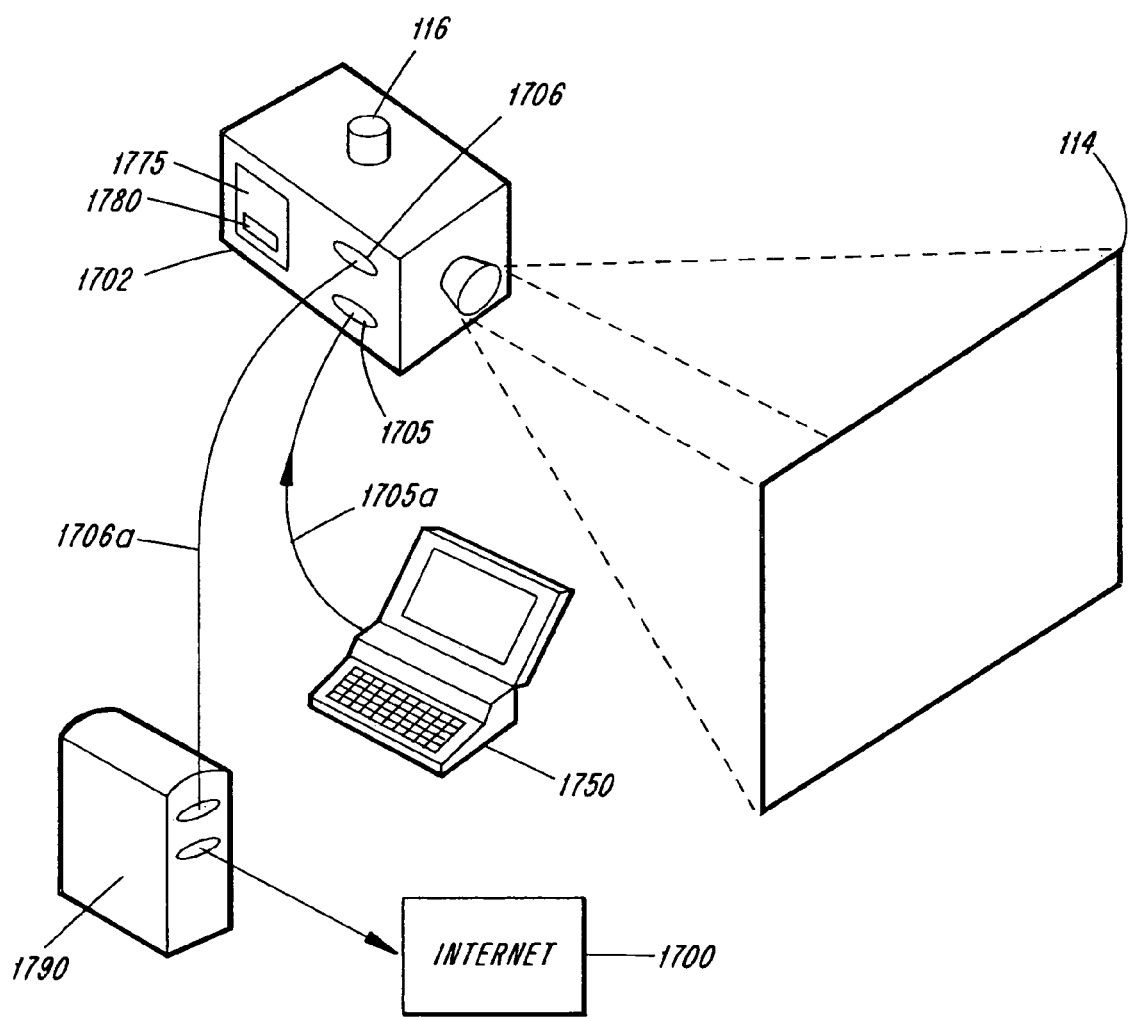
FIG. 17 depicts the components of another embodiment for capturing live presentations where the images are computer generated.

In a third embodiment for use with computer generated presentations shown in FIG. 17, the projector 1702 contains digital output and formatting for output via USB or Firewire and further contains the media processor, which can process the media into HTML and/or streaming format or other Internet language. The projector 1702 can communicate with a media server 1790 through an Ethernet interface 1706 via cable 1706*a*, from which the media can be streamed to a connection to the Internet 1700. Again, this system can produce a simulcast of the lecture, as well as store the lecture in an archive mode. This embodiment, as with the previous embodiments, can allow the use of removal media 1780 in the projector 1702. The projector 1702 can also contain a control panel 1775 for controlling various parameters associated with capturing the presentation. Optionally, the control panel can be created in software and displayed as a video overlay on top of the projected image. This overlay technique is currently used on most video and/or data projectors to adjust contrast, brightness and other projector parameters. The software control panel can thus be toggled on and off and controlled by pressing buttons on the projector or through the use of a remote control which communicates with the projector using infrared or radio frequency data exchange.

Figure 18:
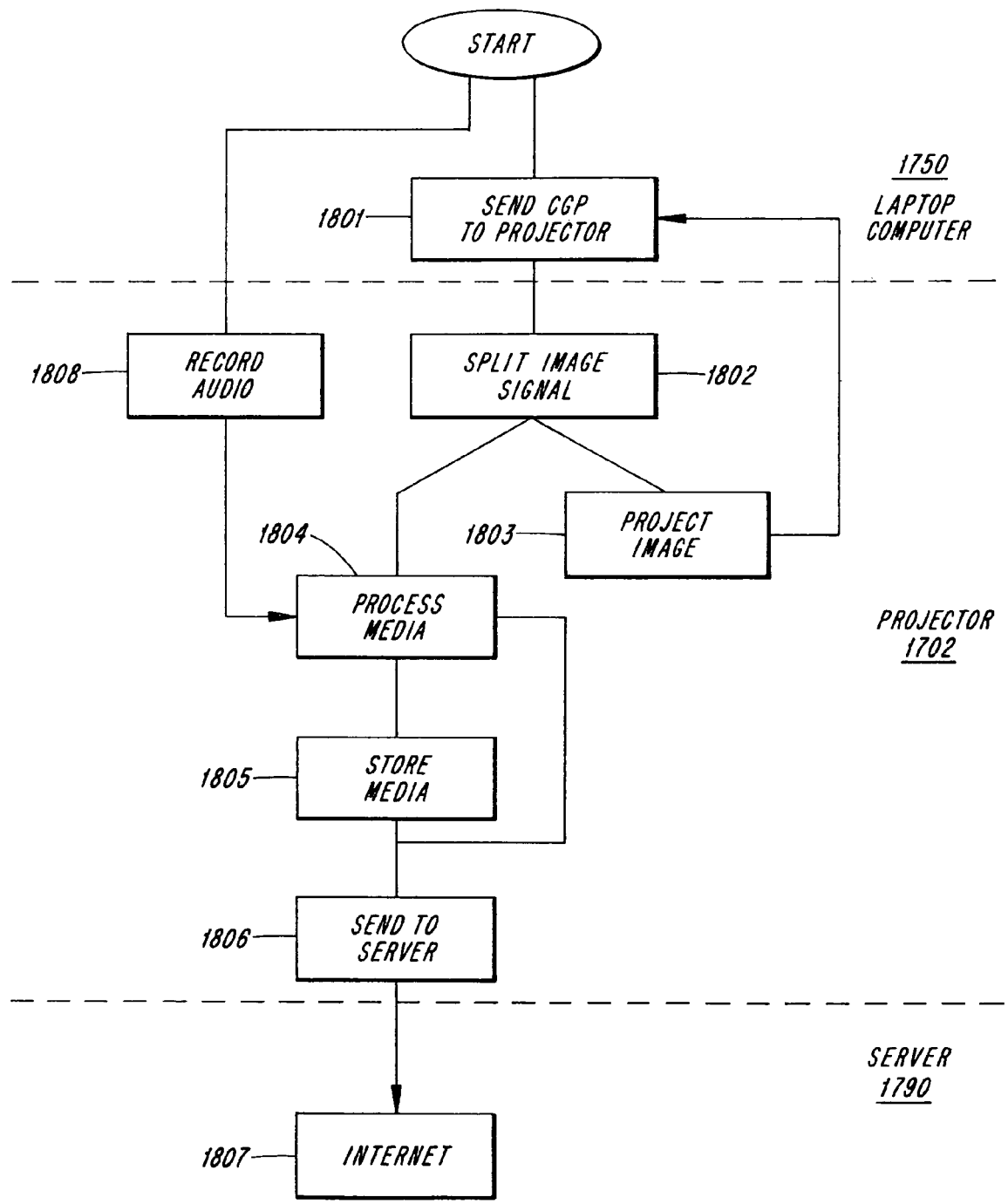
FIG. 18 is a flow chart illustrating a method for capturing a live presentation consistent with an illustrated embodiment.

FIG. 18 is a flow chart showing the different functions and components of the live presentation capture system for the embodiment shown in FIG. 17 and discussed above. The individual components in this embodiment include a computer 1750, a projector 1702 and a network server 1790. At the start of the presentation, the presenter using a laptop computer sends a computer generated presentation, i.e., image, to the projector. The image signal is then divided in step 1802, as discussed previously, with one signal being used to project the image in step 1803, and the other signal being processed along with the audio portion of the live presentation that was recorded at step 1808, in step 1804. The processed media can then be stored using fixed memory or removable memory media in step 1805. As discussed above, processed media can also be directly sent to the server 1790 through step 1806 without implementing the storage step 1805. The server 1790 in step 1807 connects to the network or Internet such that it can be accessed by a client.

4) Projector with Enhancement and Publishing Capabilities

Figure 19:
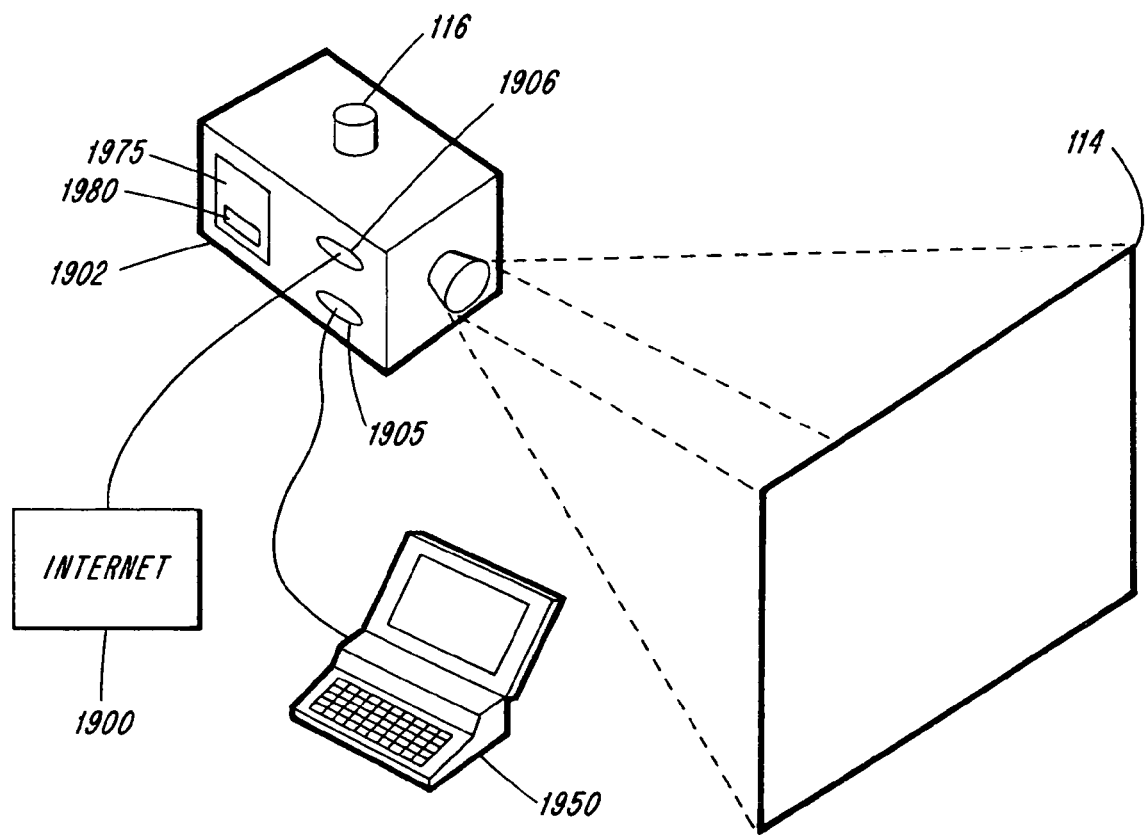
FIG. 19 depicts the components of another embodiment for capturing a live presentation where the images are computer generated.

A fourth embodiment associated with computer generated presentations, as seen in FIG. 19, includes a projector 1902 that contains all the hardware necessary to capture and serve the electronic content of the live presentation through a connection 1906 to the network through Ethernet or fiber connection. As such, the projector 1902 can capture the video content through its connection via interface 1905 and cable to a personal computer 1950, or other type of computer. The projector 1902 can capture the audio content via omni-directional microphone 116 or audio line input. The projector 1902 can also process the media into HTML and/or streaming format and further act as a server connecting directly to the Internet 1900. The projector 1902 can also contain a control panel 1975, which controls various parameters associated with capturing the presentation, as well as removable media 1980 when it is desired to store the presentation in such a manner.

Figure 20:
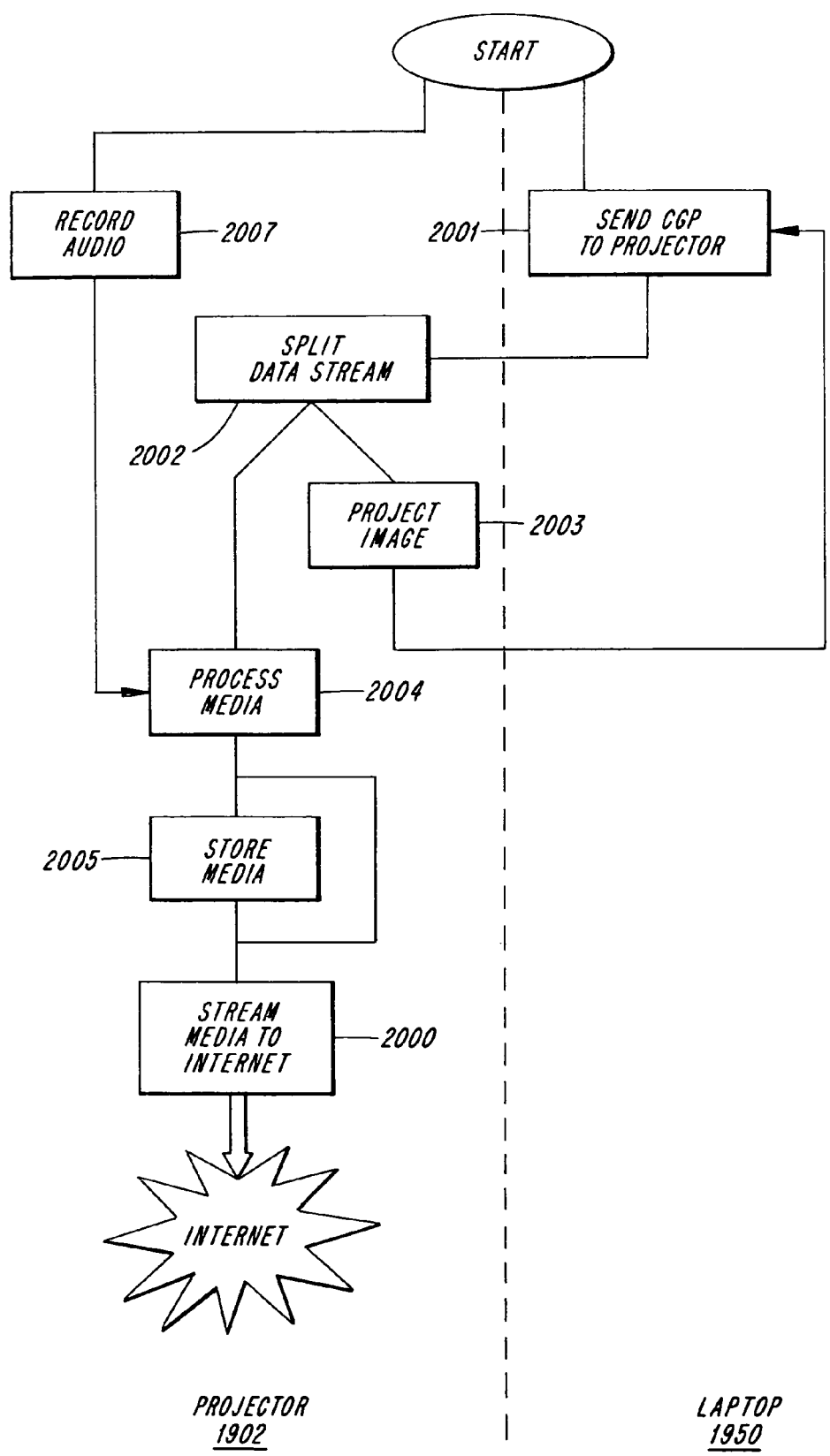
FIG. 20 is a flow chart illustrating a method for capturing a live presentation consistent with an illustrated embodiment.

FIG. 20 is a flow chart showing the functions and components used to capture a live presentation according to the above embodiment shown in FIG. 19. At the start of the presentation the presenter, using the computer 1950, can send a computer generated presentation to the projector 1902. Again, as discussed in detail above, after step 2001 the data from the image signal is split into two signals in step 2002, the second signal being used to project the image in step 2003 such that it can be viewed by the audience. The first signal is processed and synchronized with the audio portion of the live presentation which was recorded in step 2007, in step 2004. The processed media can then be stored in step 2005 and/or streamed directly to the Internet step 2006. With the functions integrated all into one projector 1902, the projector 1902 can be capable of functioning as each of the individual components, and such various interfaces and capabilities can be incorporated into the projector.

Various inputs associated with a standard projector can be incorporated into the integrated projector, including, but not limited to, digital video image and/or VGA. Outputs allowing the integrated projector to function with a standard projector, thus expanding its versatility, can also include a digital video image output for highest quality digital signal to the projector. VGA output can also be integrated into the integrated projector. USB connectors, as well as Ethernet and modem connectors, an audio input and omni-directional microphone can also be included in the integrated projector 1902. As the integrated projector 1902 is capable of many different functions using different sources, input selection switches can also be included on the integrated projector, as well as other features common in projectors such as remote control, and a variety of interfaces associated with peripheral elements.

The previous four embodiments employ similar processes for the capture of the presentation. In general, the presenter (or someone else) connects the personal computer (e.g., laptop) to the integrated projector or the in-line of the intermediate unit. The system is configured, through available switches, depending on the source, to capture characteristics unique to the source of the presentation. The audio is captured and converted to digital through an A and D converter, along with the images if the digital output from the projector is not available. The image signal is split and the image is displayed and then compressed into a standard file format, (e.g., JPEG, MPEG). The synchronization of audio and images can occur during the digitization and formatting processes. The media processing can include compression of images via a variety of methods, including color palette optimization, imagery sizing and image and audio compression, as well as indexing. Compression for use of the data in an Internet stream format can also occur during processing. During media processing, other data can also be entered into the system, such as speaker's name, title of the presentation, copyright information and other pertinent information, as desired. The information captured can then be transferred to the server, allowing it to be streamed to clients connected to a network, Internet or Intranet. As discussed in the above embodiments, the media can be served directly from one of the intermediate units or projectors, or it can be transferred to an external server, which exists as part of an Internet or is directly connected to the Internet. When the data is made available immediately over an IP connection in either a uni-directional or bi-directional manner, the device can be used for real-time teleconferencing. As such, these embodiments are compatible with other methods and systems for capturing a live presentation, as discussed earlier, and as such can include other applicable features presented in this disclosure, as appropriate. More or less modularization of the system can be employed in response to varying needs and varying user assets.

5) Use of Digital Media with Embedded Processor/Operating Systems

Another embodiment involves the use of digital media which contain microprocessors and independent operating systems. One representative device, the Mine from Teraoptix (mineterapin.com/terrapin on the World Wide Web) contains the Linux operating system, digital storage (12 gigabytes of storage) and Ethernet, USB, and IEEE 1394 connectivity. This device also allows for Internet connectivity for file uploads and downloads. Coupling this device with the different embodiments can allow for a solution which provides (or replicates) the digital audio recording functionality, as well as provides image storage through connection of the projector which may be equipped with a USB, Ethernet, or IEEE 1394 output).

6) Software-Based Capture Embodiment

The laptop or presentation computer, in parallel with running the presentation, can capture the presentation. The following components can be employed to affect lecture capture in a software-based solution and are each described below in further detail:

i. Generation of time-stamps;
ii. Visual media processing;
iii. Audio capture and processing;
iv. Synchronization of media;
v. Addition of search methodologies to on-line presentations; and
vi. Placement of materials on the Web and use of emerging distance learning standards.

The software involved in the capture process is referred to herein as the "capture application" (CA). The CA can run on the presentation system or on the server (or can partially run on both). The software can be written in standard personal computer programming languages such as C, C++, JAVA, or other software languages.

Several approaches can be employed for (i) generation of time-stamps, including:

a. Use of the Microsoft COM protocol. When the presentation makes use of applications which support COM (e.g., the Microsoft Office Suite), the applications can communicate back to the CA all of the operations and functions (events) which were performed using the application during a presentation. By associating each event with a corresponding time-stamp, the CA can create a time-line of events associated with the media, allowing for the storage and transmission of a presentation.

b. Use of digital audio to generate time-stamp data. Events during a presentation can be punctuated by changes in a presenter's audio. For example, a presenter may pause between the presentations of different media elements and/or the presenter's speech may change in pitch at the end of the display of a media element. Furthermore, the presenter may use 'cues' which signal changes in media (such as a statement, 'on the next slide'). Through signal processing techniques and/or speech recognition, these events can be abstracted to create a time-stamp/event log.

c. Use of changes in the visual elements. Through the use of digital image processing software, time-stamp data can be created. The digital image processing techniques can identify movement of the pointer (associated with mouse movement) over particular regions of the image, indicating changes in the presentation. Other techniques involve changes in color palette of images, and/or image file size.

d. Monitoring keyboard and mouse functions. Through the use of software which provides a time-stamp when an event occurs, such as mouse clicks, movement, as well as keyboard key depression, a time-stamp log can be created.

e. PowerPoint slides presentations. Existing PowerPoint presentations can be opened using an appropriate version of Microsoft PowerPoint. The software can then provide the ability to capture the PowerPoint presentations for broadcast on the Internet. This functionality can further allow for the conversion of the presentation into a Microsoft Media Player format.

f. Any combination of the above techniques.

With each of the above time-stamp generation approaches, the presentation computer can initiate capture either locally on the presentation machine itself and/or on the server.

Several approaches can be employed for (ii) visual media processing. For example, the following approaches for image capture on the presentation computer can be implemented in singular or in combination.

a. Local Capture of Presentation Images. An example of local image capture makes use of software techniques deployed by companies such as TechSmith for screen capture (techsmith.com on the World Wide Web), which can capture images through the use of trigger events or on a timed basis.

b. Capture of Images through File Conversion. Optionally, the native files used during a presentation can be converted into Web-ready formats (e.g., JPEG) on the presentation machine, server, or any intermediary device containing a microprocessor.

c. Video Capture. Use of a Web cam (such as produced by 3Com) or other digital video source with a standard computer interface (e.g., USB, IEEE 1394) can provide imaging of the presenter, which can be combined with the presentation.

Several approaches can be employed for (iii) audio capture and processing, including the use of audio capture technology available on many computers, in either hardware that exists on the motherboard or that is provided with the addition of a digital audio acquisition card from suppliers, such as Creative Labs. Optionally, a microphone which converts the audio signal into a digital format, such as USB available from HelloDirect (hellodirect.com on the World Wide Web), can be connected to the PC to enable audio capture. Audio capture software can capture the audio into memory, hard-drive, removable storage, or transmit directly to a server through the use of TCP-IP protocols or direct connection through standard data cables such as USB or IEEE 1394 cabling. After capture, the audio can either be stored in a variety of standard audio formats (e.g., MP-3, MP-2, AIFF, WAVE, etc.) or directly into a streaming format such as QuickTime, or RealNetworks streaming formats, among others.

A device, such as the Mine from Teraoptix Mine, can be used to augment digital audio capture and/or Internet connectivity. For example, software written in C, Java, or other programming languages, which is stored and executed on the Mine device, can record the digital audio on the Mine device while communicating with the presentation personal computer. This communication can involve a standardized time generation which is used to generate the time-stamps during the presentation. As a result, this system can segment the audio recording and time-stamping functionality to the Mine device and the image capture occurring on the system being used for the presentation.

Several approaches can be employed for (iv) addition of search methodologies to on-line presentations. For example, enhanced search capabilities can be created through the use of speech recognition, as well as optical character recognition, abstraction of text, and other data and their use in a searchable database (as described above). Metadata can also be used for indexing and search and retrieval.

Several approaches can be employed for (v) placement of materials on the Web and use of emerging distance learning standards. For example, integration of the media and its presentation on the Web can be enabled by transmitting the captured audio, visuals, and time-stamp information, along with other available data (including speech recognition format, closed caption data), obtained as described above. The additional search methodologies, as well as support of distance learning standards described above, can be applied to this embodiment. This data can be placed on a server and made available to end-users over a network (e.g., Intranet, Internet or Wireless Internet network). Alternatively, the presentation can be placed on a removable media such as a CD-ROM or DVD for distribution.

Enhanced Capture, Management and Distribution of Live Presentations

A detailed description of an exemplary hardware-software platform enabling rapid conversion of live presentations into electronic media and effective management of captured media assets for distribution follows. The electronic media can be transmitted over the Internet using a variety of audio-visual technologies. These technologies can offer a range of media formats, from full-motion video to visual-only or audio-only formats, as described above. Exemplary streaming video formats include Macromedia Flash®, Microsoft Media 9 or 10 or O1® formats, and Apple QuickTime®, among others. Exemplary audio formats include MP-3 and podcasts, among others. An exemplary slide and audio format includes Macromedia Flash®. Text-based formats include PDF and other text/graphic formats. In addition, the transmission and storage of these media materials can range from electronic formats to actual physical formats (e.g., DVD and CD or monographs).

Effective management of the captured presentations is needed to handle greater quantities of content captured over relatively short periods of time, and to enable rapid release of the content for distribution. For example, effective presentation management techniques can be implemented to appropriately determine when a presenter begins and ends a presentation, to assign metadata associated with the presentation to the captured digital media (audio/visuals) for the presentation, to create enhanced navigation tools (e.g., thumbnails and additional metadata, which can be time-based), to provide editorial tools for replacement of copyrighted or other undesired information in a presentation, and to enhance the presentation with additional information (e.g., a standard title at the beginning of each presentation and/or a title specifying a sponsor of a lecture, as well as when the question and answer portion of a presentation began, etc.).

Figure 21:
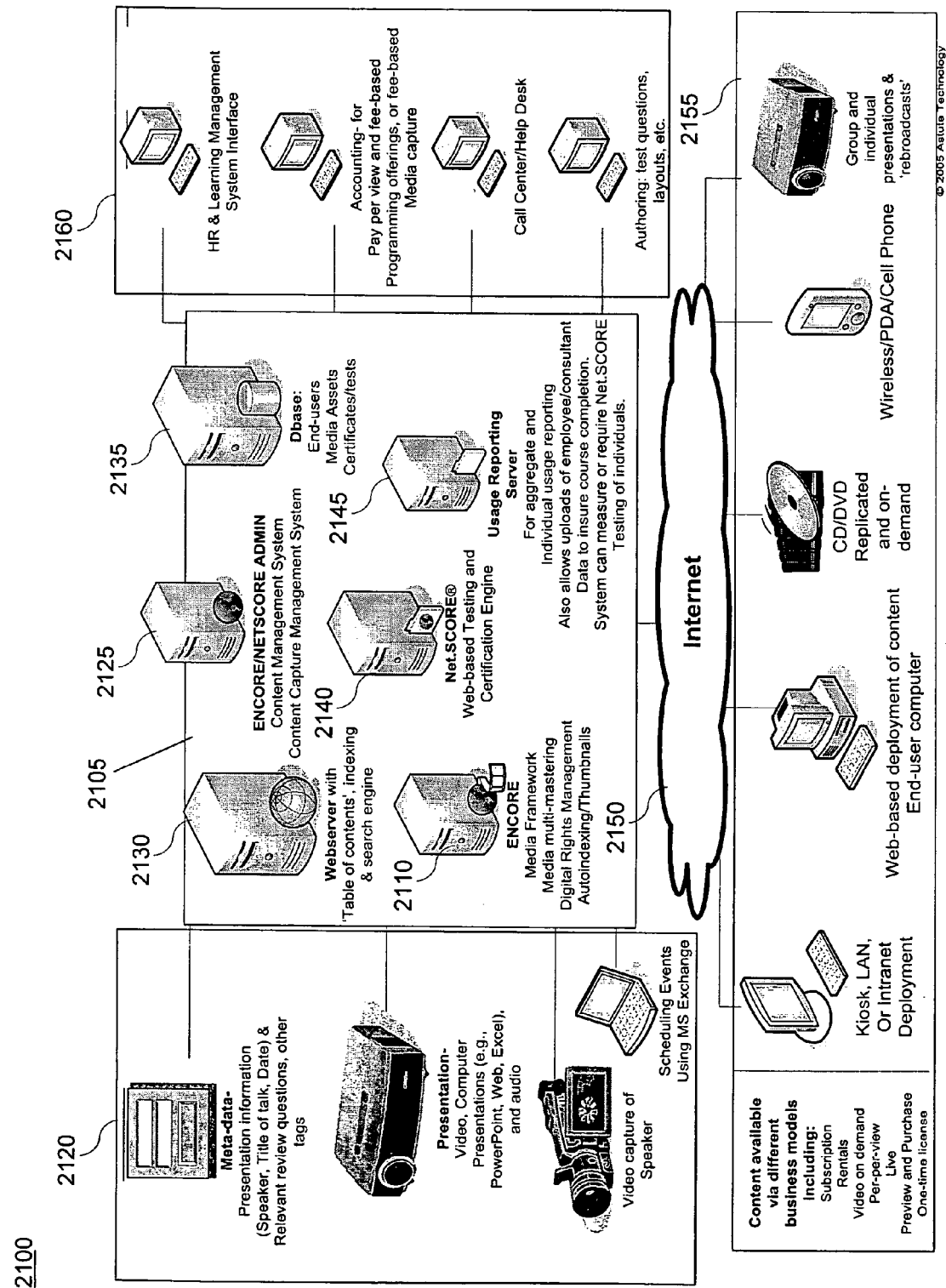
FIG. 21 illustrates an exemplary environment for conversion of live presentations into electronic media consistent with embodiments of the present disclosure.

FIG. 21 illustrates an exemplary environment 2100 for conversion of live presentations into electronic media consistent with embodiments of the present disclosure. The environment 2100 includes a hardware/software capture platform 2105, data sources 2120 (e.g., metadata, video, computer presentations, etc.), a communications network 2150, supported distribution media 2155 (e.g., kiosk, Internet websites, CD/DVD, PDA, etc.), and interfaces for additional services 2160 (e.g., human resources, accounting, help desk, authoring, etc.).

In the embodiment of FIG. 21, the hardware/software capture platform 2105 includes a capture device 2110, a web server 2130, a database 2135, a centralized device 2125, a testing and certification tool 2140, and a reporting server 2145. Hardware/software capture platform 2105, as well as other embodiments of the present disclosure, can support distribution of live presentations, on different media for use on different platforms, as well as support on-line testing and certification.

1) Rapid Capture of Content

A large number of presentations are typically delivered over the course of several days at a session, such as a conference or meeting, making it difficult for an attendee to be present at each of the live presentations. Thus, recognizing the need to simultaneously record multiple live presentations of a session, digital capturing devices, such as those disclosed in U.S. Pat. No. 6,789,228, can be used to capture presentation content with simultaneous audio and video. Video of the data portion of a presentation, including image data of sequentially presented visual aids, can be input to a capture device, such as the ENCORE capture device from Astute Technology, using VGA or DVI. In some embodiments, the resolution of the video images can be preserved by using a frame rate of capture of approximately 12-15 frames per second. The capture device can be configured to capture dynamic data embedded in a presentation, such as movies, animations, transitions, etc., as well as electronic pointer position data.

For example, the hardware/software capture platform 2105, shown in the embodiment of FIG. 21, includes an ENCORE capture device 2110, which can be configured to capture media assets of live presentations of a session. The media assets can include image data of sequentially presented visual aids accompanying the live presentations, as well as audio data. Exemplary visual aids include images of slides, photographs, graphs, discrete motion picture clips, and text accompanying the live presentations.

The capture device can also be configured to enable switchable sources, for simultaneous capture of NTSC video (e.g., talking head), as well as the selection of other VGA/DVI or video sources into the captured media file. For example, in one embodiment, the image data for a presentation can include the visual aid images the presenter displayed during the presentation, as well as video images of the presenter during the presentation. In addition, real-time transition effects can be included, as well as title information and lower-third information (such as the name of a presenter) shown in the alpha channel during the capture and transmission processes. The ability to select and switch content sources can further be enabled through custom code extensions using, for example, Microsoft DirectShow® technology for capturing and encoding the media files. In one implementation, the media assets can be simulcast during archival capture.

Furthermore, the capture device can be configured to simultaneously capture high resolution image data, which can be used to augment the presentation. These high resolution images can be used for OCR, as well as to enable close-up views of content.

Figure 22:
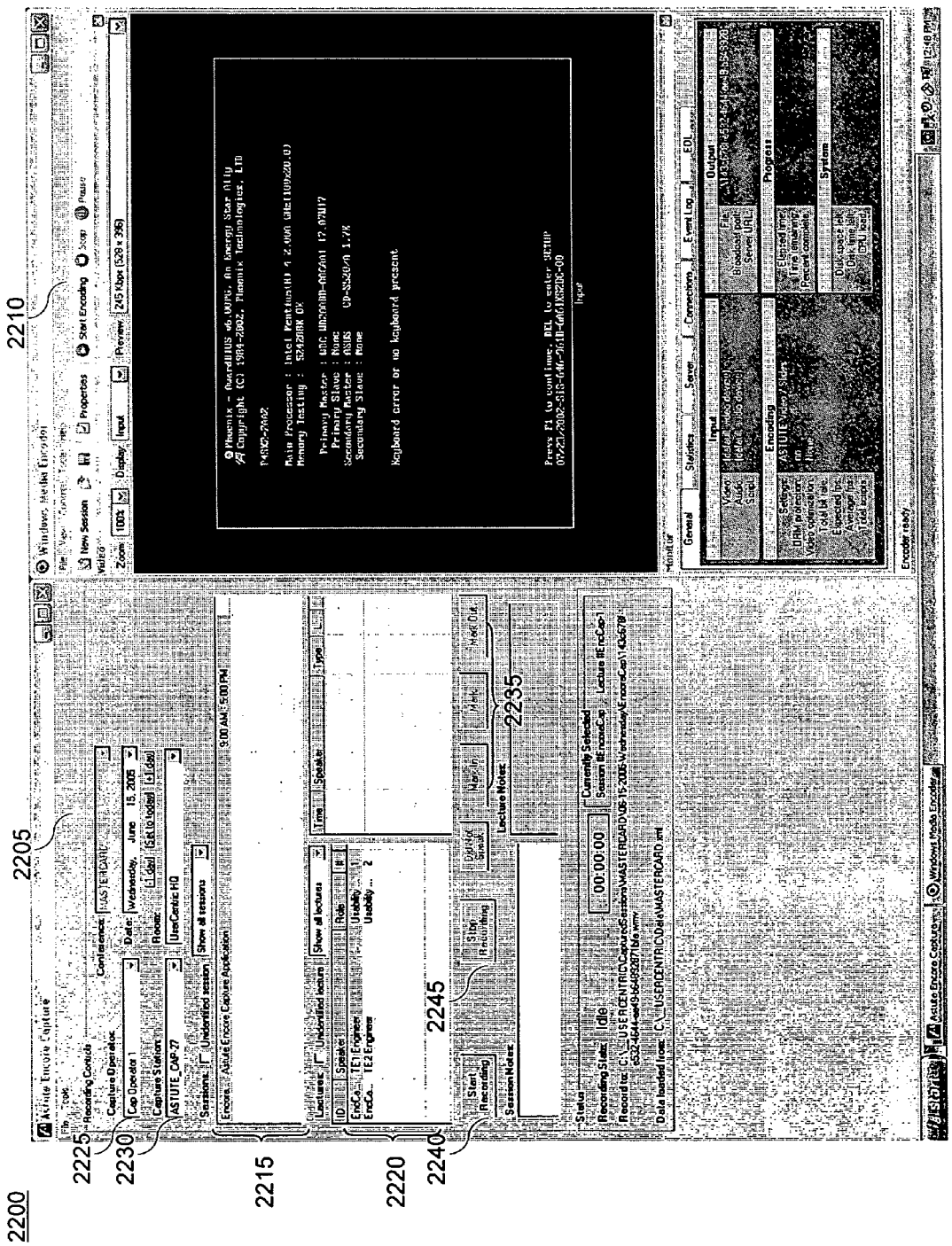
FIG. 22 depicts an exemplary user interface for a capture application according to an embodiment of the present disclosure.

Each capture device can include an interface that enables real-time image data marking of the image data for identification of individual images and session marking of the image data for demarcation of individual presentations of the session. For instance, FIG. 22 depicts an exemplary user interface 2200 for a capture application that can be executed on a capture device in accordance with an embodiment of the present disclosure. As shown in the embodiment of FIG. 22, the capture application includes a capture control window 2205 and a Windows Media Encoder® (WME) window 2210. Using various fields in the capture control window 2205, a user can select an appropriate session 2215 (or "unidentified session" if the session is not known) and corresponding presentation/lecture information 2220, as well as a capture operator 2225 and a capture station 2230 (which can be a preset field). Next, the user can initiate capture of a presentation by selecting a "Start Recording" button 2240. Note that at this point, the WME window 2210 does not need to be used to change preset capture parameters.

Once capture of a presentation is initiated, the user can set markers at any point during the capture process to mark a particular event. For example, marker buttons 2235 can be used to mark "in" the beginning and mark "out" the end of the presentation, as well as to set random markers. Notes can be associated with the markers (e.g., the user can type in a note after setting a marker), which can be helpful in the subsequent editing phase. At the end of the presentation, the user can select the "Stop Recording" button 2245 to stop the capture process. Note that the WME window 2210 can typically take a few seconds to stop as well. The user can then close the capture application.

Figure 23:
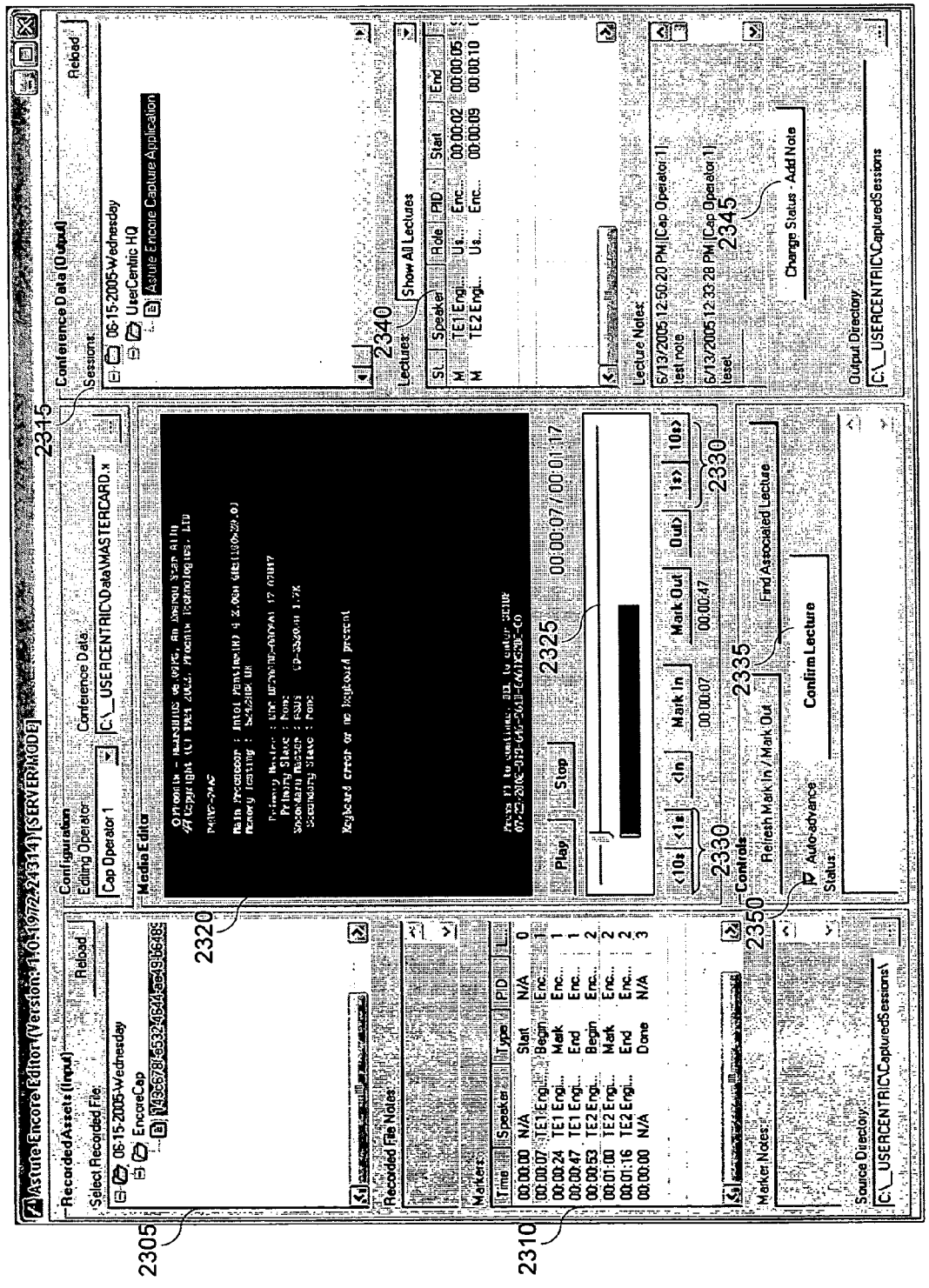
FIG. 23 depicts an exemplary user interface for an editor tool according to an embodiment of the present disclosure.

FIG. 23 depicts an exemplary user interface 2300 for an editor application that can be executed on the capture device or on the centralized device according to embodiments of the present disclosure. The editor application can be configured to allow for selection of a captured media file via a "Select Recorded File" dialog box 2305. In one implementation, the captured media assets can be organized by date and session ID. After a user selects a session, the editor application can be configured to automatically display the session file and the markers that have been set for the session in the "Markers" window 2310. The editor application can also display in the "Conference Data" portion 2315 of the interface 2300 any associated information that has been stored in a database for the session.

A "Media Editor" preview window 2320 can be used to play back an entire recording for a captured session and adjust the markers for the individual presentations of the session. For example, when a marker in the "Markers" window 2310 is selected, a video progress slider 2325 can automatically advance to the proper position, highlighting the beginning and the end of the selected segment (i.e., presentation). The markers can be adjusted as needed, and the start and end points of the segment can be reset, if necessary. Additionally, one second and ten second buttons 2330 can help the user navigate through the video of the selected segment.

When final markers are set, the "Confirm Lecture" button 2335 can be selected to confirm the selected segment as an individual presentation/lecture, thereby associating a specific presenter/speaker from the "Lectures" window 2340 with the confirmed segment. Once confirmed, the status of the lecture/presentation can be changed from "Marked (M)" to "Markers Confirmed (MC)" by selecting the "Change Status—Add Notes" button 2345. Optionally, the editor application can be configured to display a warning if the user attempts to overwrite existing markers for a specific speaker/lecture. Additionally, an "Auto-advance" checkbox 2350 can be selected to automatically advance to a next lecture segment after having confirmed a selected lecture segment. This editing process can be repeated until every lecture/presentation in the session is confirmed.

In an embodiment, the capture technology described herein can be employed for behavior monitoring of end-users. For example, a view of a user as they are interfacing with a computer can be captured. In this way, developers can analyze the user's expressions and interactions with the computer interface to implement ergonomic modifications to the computer interface.

2) Rapid Enhancement of Content

Because it can be cumbersome and time consuming to edit a captured media file (e.g., to divide the media file into portions to incorporate only a specific speaker's presentation or to edit a presentation), a high-quality, rapid technique for producing digital archives/libraries of content is provided. A centralized device can be configured to process the captured media assets from each capture device. In one embodiment, the centralized device can automatically divide the captured media assets for a session into discrete files associated with the individual presentations of the session based on the session markings, which can be set and confirmed using the exemplary capture and editor applications shown in FIGS. 22-23. For example, the hardware/software platform 2105, shown in the embodiment of FIG. 21, includes a centralized device 2125, which can be configured to process the captured media assets from each capture device 2110.

The centralized device can be used to rapidly specify when a given speaker is presenting during a presentation (i.e., the start and stop points in time), as well as to associate metadata (e.g., the speaker's name, title of the presentation, etc.) and other supplemental materials with the presentation. This information can then be associated with the recorded media files. After the edit "in" and "out" points of a particular lecture/presentation are specified, the centralized device can be used to split the captured audio/visual files into discrete media files, which are associated with particular lectures. In addition, a scene/slide detection technique can be employed to determine changes in the sequence of a presentation to create unique, thumbnail images of the presentation, thereby enhancing navigation.

3) Post Processing

After a session of presentations is captured and marked, the centralized device can be employed for post processing. The post processing can include creation of thumbnail images for enhanced navigation. For example, the scene/slide detection technique can enable a user to save individual images from captured lecture files every time a slide change occurs, thereby creating thumbnail images with appropriate time-stamp information. The thumbnail images can also be used in conjunction with a player module for navigation of captured video. During navigation, the location of the videos, the output path, and the media server URL for both ASX and RPM files can be specified.

Presentation/lecture files can be created from captured session files based on "in" and "out" markers that have been confirmed using the editor application and by creating thumbnails via the scene/slide detection technique. Additionally, identified slides (i.e., video segments) can be replaced with placeholder slides that can be selected using an administrative tool in accordance with an embodiment of the present disclosure.

The centralized device can run unattended and process captured media assets, which may include session files, presentation/lecture files, or the like, as the files are received or pass through production workflow. The centralized device can synchronize with a database via a Web server and can run concurrently on several computers for faster processing and turnaround time at a session/venue.

Figure 24:
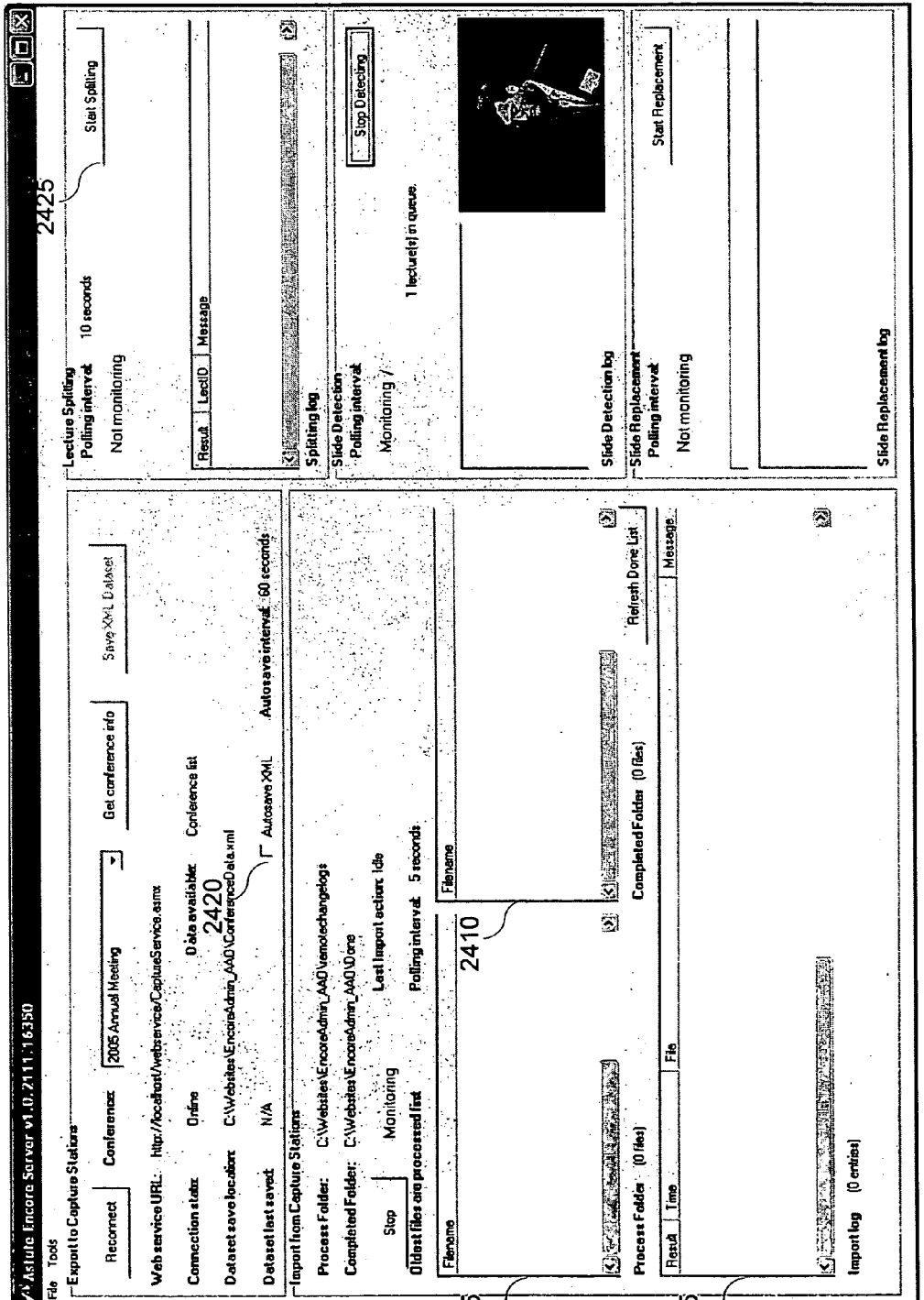
FIG. 24 depicts an exemplary user interface for a server application according to an embodiment of the present disclosure.

FIG. 24 depicts an exemplary user interface 2400 for a server application that can be executed on a centralized device according to an embodiment of the present disclosure. The server application can be employed for rapid enhancement and post processing of captured content received from the capture and/or editor applications, and for synchronizing metadata between applications (e.g., the administrative tool, the capture an editor applications, a kiosk tool, a production website, etc.).

The centralized device can primarily exchange data with individual capture stations to retrieve the captured media assets and to split out individual presentation files from the captured sessions. For example, as shown in FIG. 24, once the import of captured media assets is initiated, the server application can search for and display identified recorded sessions in the "Process Folder" window 2405. Successful imports can be listed in both the "Completed Folder" 2410 and the "Import Log" 2415.

By selecting an "Autosave XML" checkbox 2420, an up-to-date event data file (e.g., "conferencedata.xml") can be created at a certain interval, which can be used by both the capture and editor applications. Automatic splitting of imported media assets can be initiated by selecting a "Start Splitting" button 2425. The server application can then monitor for presentation segments for which markers have been confirmed (i.e., the markers can be set during capture using the exemplary capture application shown in FIG. 22 and confirmed using the exemplary editor application shown in FIG. 23). When the markers for a presentation are confirmed, the server application can split out that particular presentation file from the media assets captured for the entire session. After a being split out, the presentation's status can be changed (e.g., to "Ready for Quality Control (RFQ)").

4) Enhanced Search and Retrieval

Optionally, the scene/slide detection technique can be used in conjunction with OCR software to create time-stamped files containing terms, which can enhance search and retrieval of the captured media assets. Additionally, OCR can be applied to the visual aid images displayed during the presentation, and speech recognition can be applied to the audio data recorded during the presentation to enable transcription of the words spoken when the visual aid images were presented. In this way, the entire presentation can be searched. For example, a user can search transcripts of the visual aid images and the presenter's spoken words to locate particular topics of interest.

The scene/slide detection technique can also be used to create thumbnail images, which can be used to provide users with visual cues of lecture content, thereby enabling rapid search and retrieval of captured presentations/lectures.

5) Rapid Review of Materials

FIGS. 25-28 depict exemplary user interfaces for managing captured presentations using a web-based administrative tool according to an embodiment of the present disclosure. In addition to managing lectures captured for a conference, the administrative tool can also integrate a workflow that enables, among other functions, quality control of lectures after thumbnail images have been generated, editing of lectures by replacing selected slides with placeholder slides/video clips, which can be inserted at the correct location via the server application, and removal of unwanted thumbnail images when extra thumbnails are generated. A user can also use the administrative tool to alter, on a per-lecture basis, parameters used for scene/slide detection and can subsequently re-run scene/slide detection when a particular lecture requires adjustment.

Figure 25:
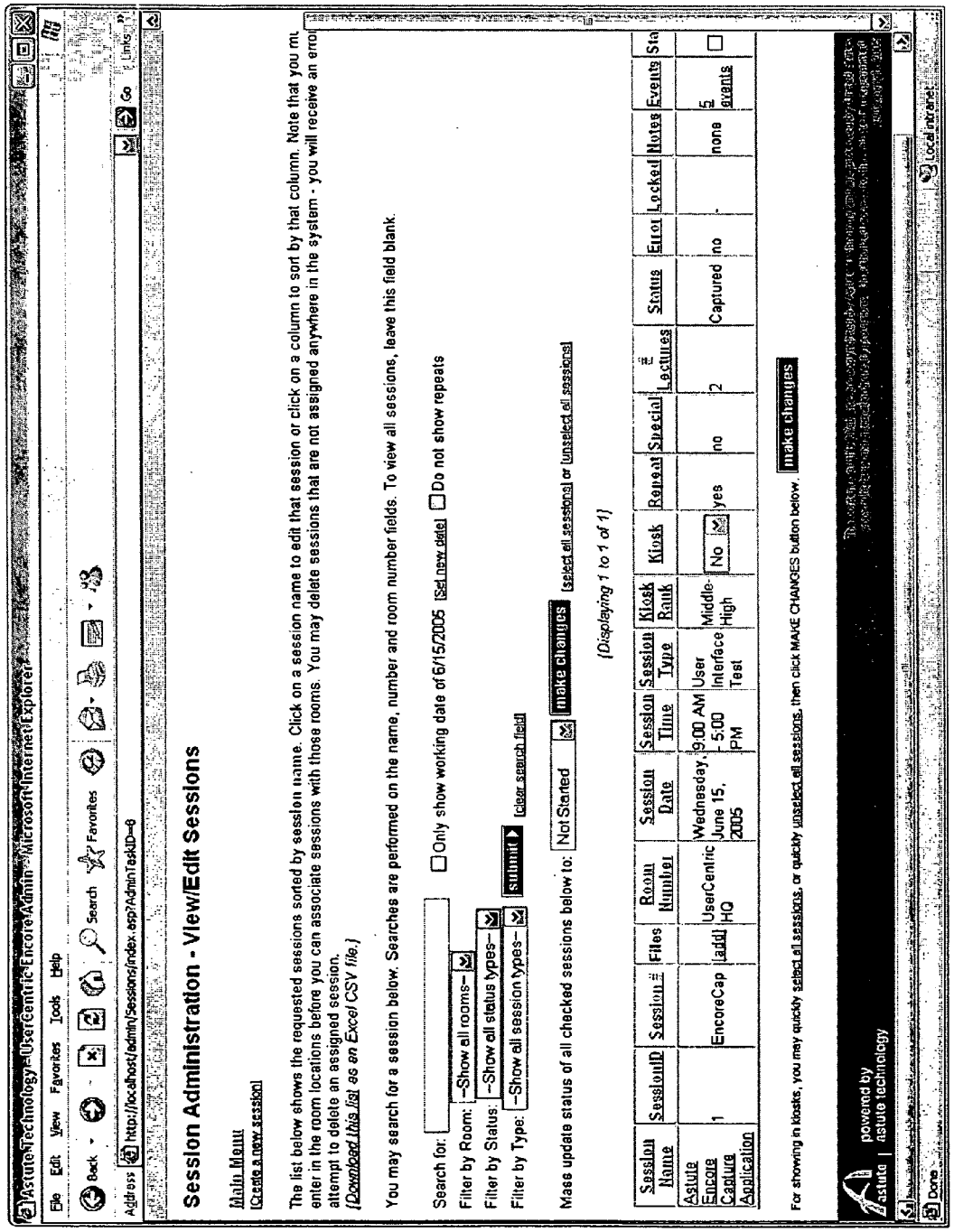
FIGS. 25-28 depict exemplary user interfaces for an administrative tool according to an embodiment of the present disclosure.

FIG. 25 depicts an exemplary user interface 2500 for the administrative tool according to an embodiment of the present disclosure. As shown in FIG. 25, the administrative tool can be implemented as a web-based tool for managing captured presentations/lectures, as well as specifying particular lectures for review, quality control, and editing prior to production. The administrative tool can also be used to enable rapid visual review of captured presentation media by employing scene detection algorithms to detect scene changes. The administrative tool can also enable an end-user to review the captured presentation content and make substitutions and/or deletions, as necessary.

6) Removing Slides and Inserting Visual Information

The administrative tool can be configured to manage the processed captured media assets to produce modified presentations. For example, it might be desirable to remove particular captured presentation content (e.g., content which might be published in journals, or content for which the speaker might not have copyright permission to reproduce in volumes that are to be sold as part of an electronic collection created using the techniques described herein). In one embodiment, the administrative tool can be configured to enable modification of the visual aid images that are identified by image data markings set during capture using the capture application.

Figure 26:
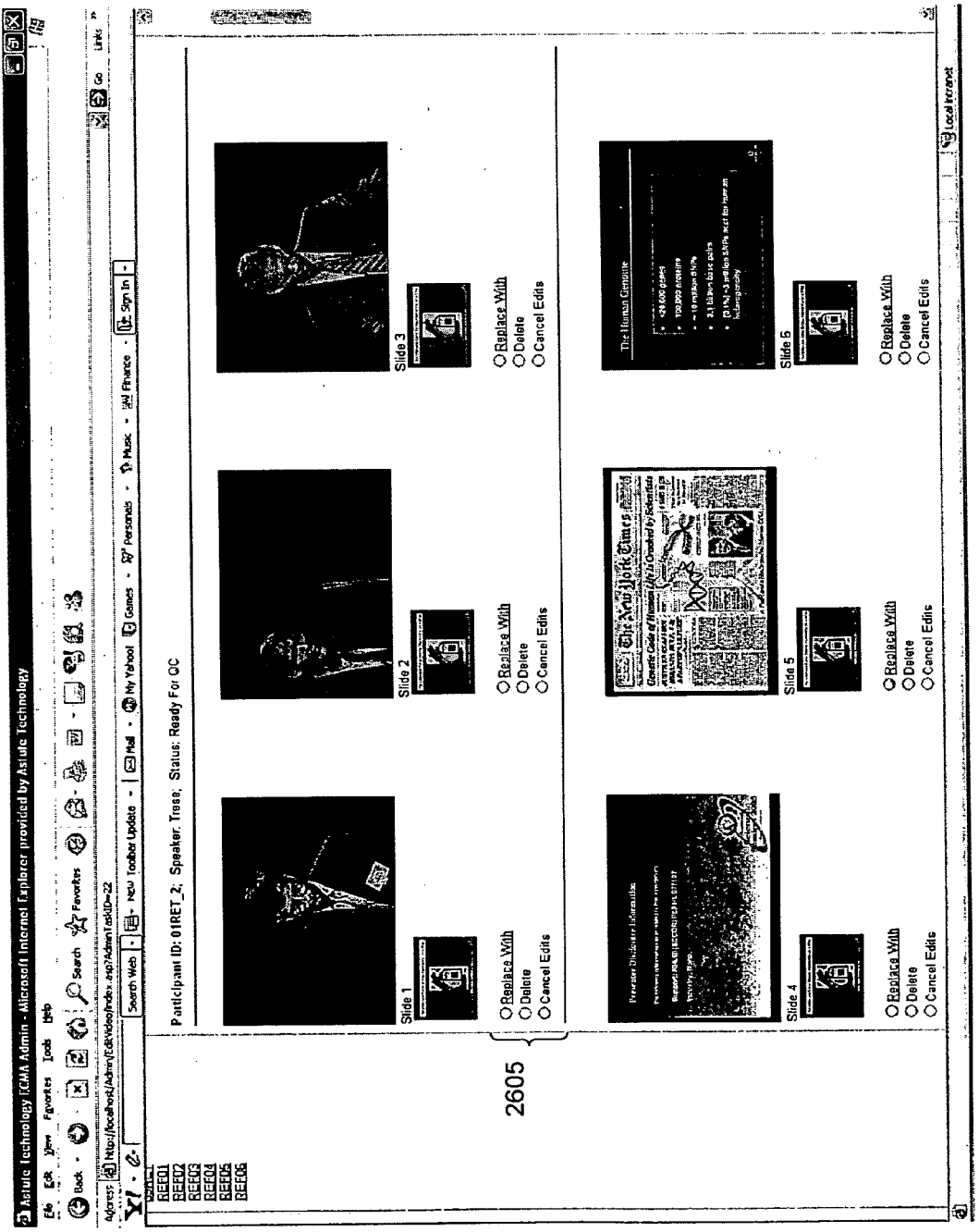
Figure 27:
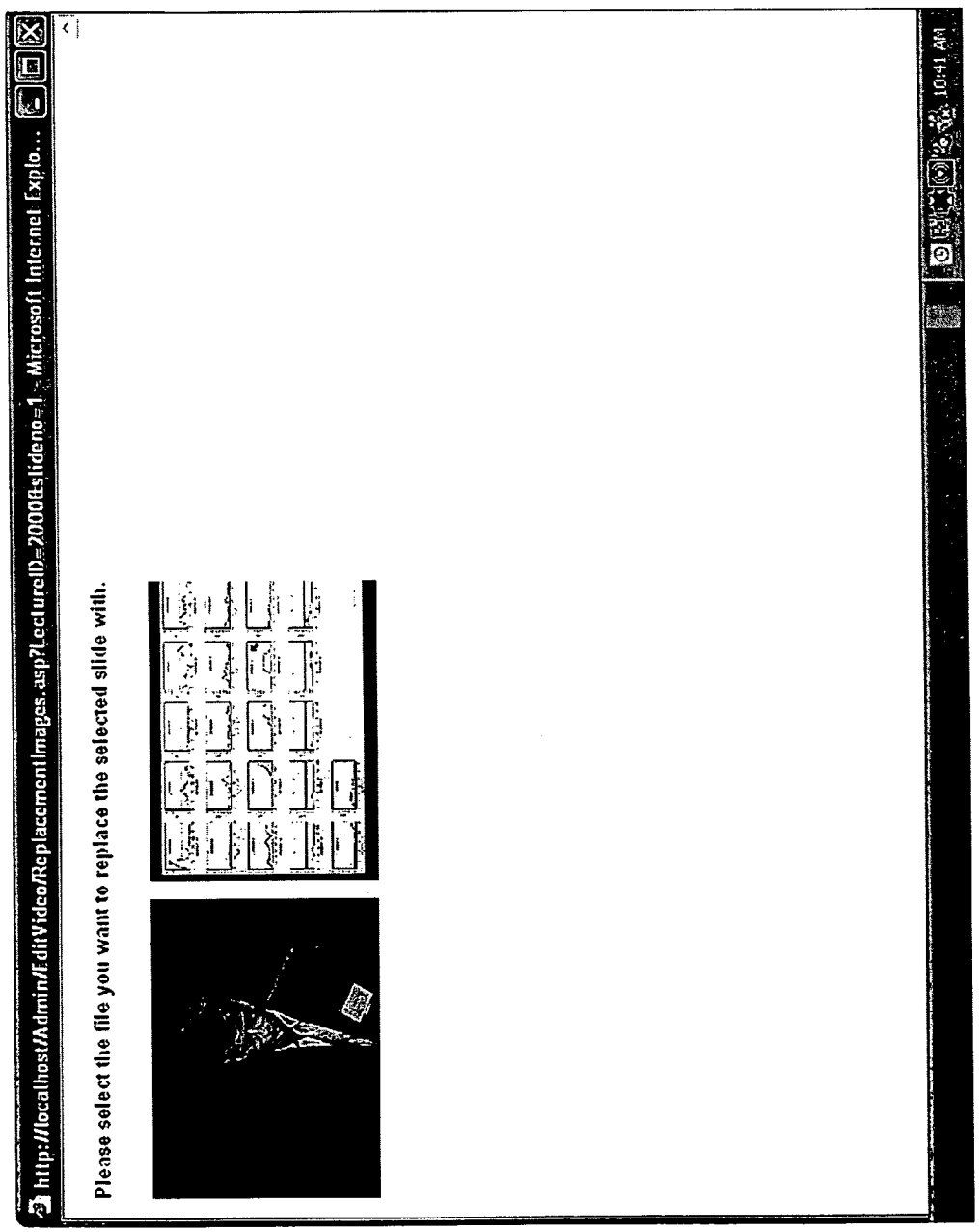
Figure 28:
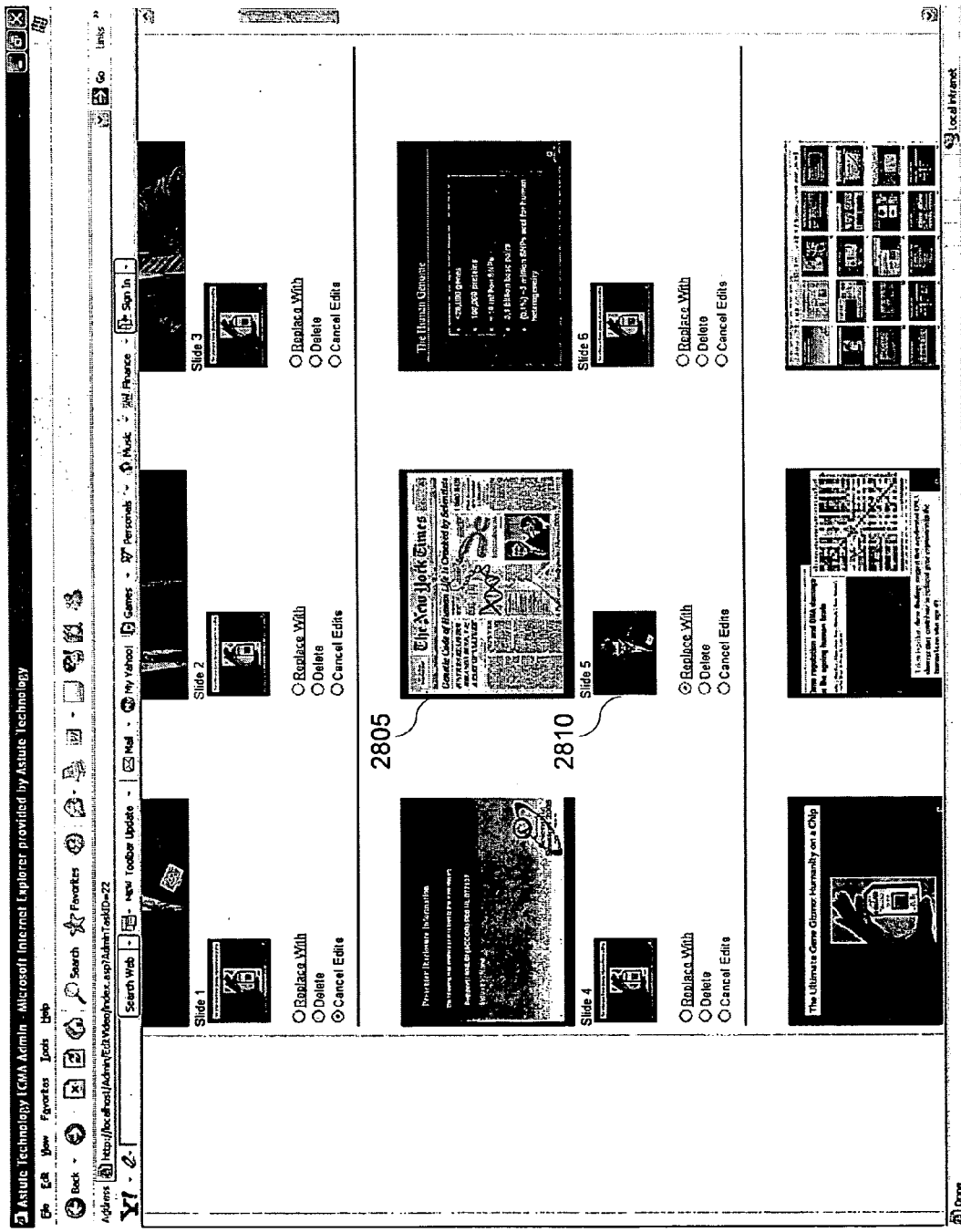

FIG. 26 illustrates an exemplary user interface 2600 for the administrative tool that enables a user to edit a presentation by selecting a radio button 2605 to replace selected slides with placeholder slides/video clips and delete unwanted thumbnail images when extra thumbnails are generated. FIG. 27 illustrates an exemplary pop-up window 2700 that can be displayed when the user selects the "Replace With" option for a particular slide. As shown in FIG. 27, the user can then select placeholder slides/video clips from a folder of placeholder content with which the selected slides can be replaced. For example, as shown in FIG. 28, the user selected "Slide 5" 2805 for replacement with an image of the presenter 2810. Other replacement content can be used to replace selected images, such as advertisements, presentation previews, information related to presentations, and information related to presenters, etc.

When a slide is selected for replacement or deletion, a rapid "stitching" technique for editing captured presentation files can be used to change video content without the need for re-rendering the video. Stitching can be used to eliminate the typical burden of video editing and re-rendering and re-compiling the edited files into a new digital media file. For example, the administrative tool can be used to detect keyframes in a video stream and enable an end-user to select a video sequence that can be substituted for a scene to be deleted. Using low-level C code, or other low-level code, the administrative tool can stitch the video files together at edit points, thereby eliminating the need for re-rendering the video and reducing the time required to edit a captured video stream to seconds (typical video editing applications can require up to a 1:1 time ratio between duration of a video and amount of rendering time required to process and produce a final edited product). The stitching technique can also preserve audio associated with the video sequence.

7) Volume Division and Designating Output Means

The administrative tool can also be used to divide captured sessions/conferences into logical segments, and to publish the segments for various media types, which can include physical and/or on-line distribution media. In an embodiment, the distribution media can be configured to incorporate e-commerce functionality, such as pay-per-view, sponsorship-based payment, subscription models, and institutional sales, among others.

8) Replication Enhancement

When physical media replication is desired, a production tool can be used to enable rapid creation of digital media, which can be transferred and reviewed on-line prior to replication on or off-site. Using the aforementioned techniques and tools, replication can be achieved rapidly (e.g., within minutes) following a presentation.

In one embodiment, the production tool can be configured to format the modified presentations of at least one session/conference for distribution on distribution media. For example, the production tool can be used to divide the conference into different logical volumes or tracks. The production tool can also be used to specify desired publication media (e.g., on-line, DVD/CD, etc.), as well as include navigation functions and other media associated with particular presentations, such as abstracts, articles, or the like, which can have various formats, including PDF format.

Figure 29:
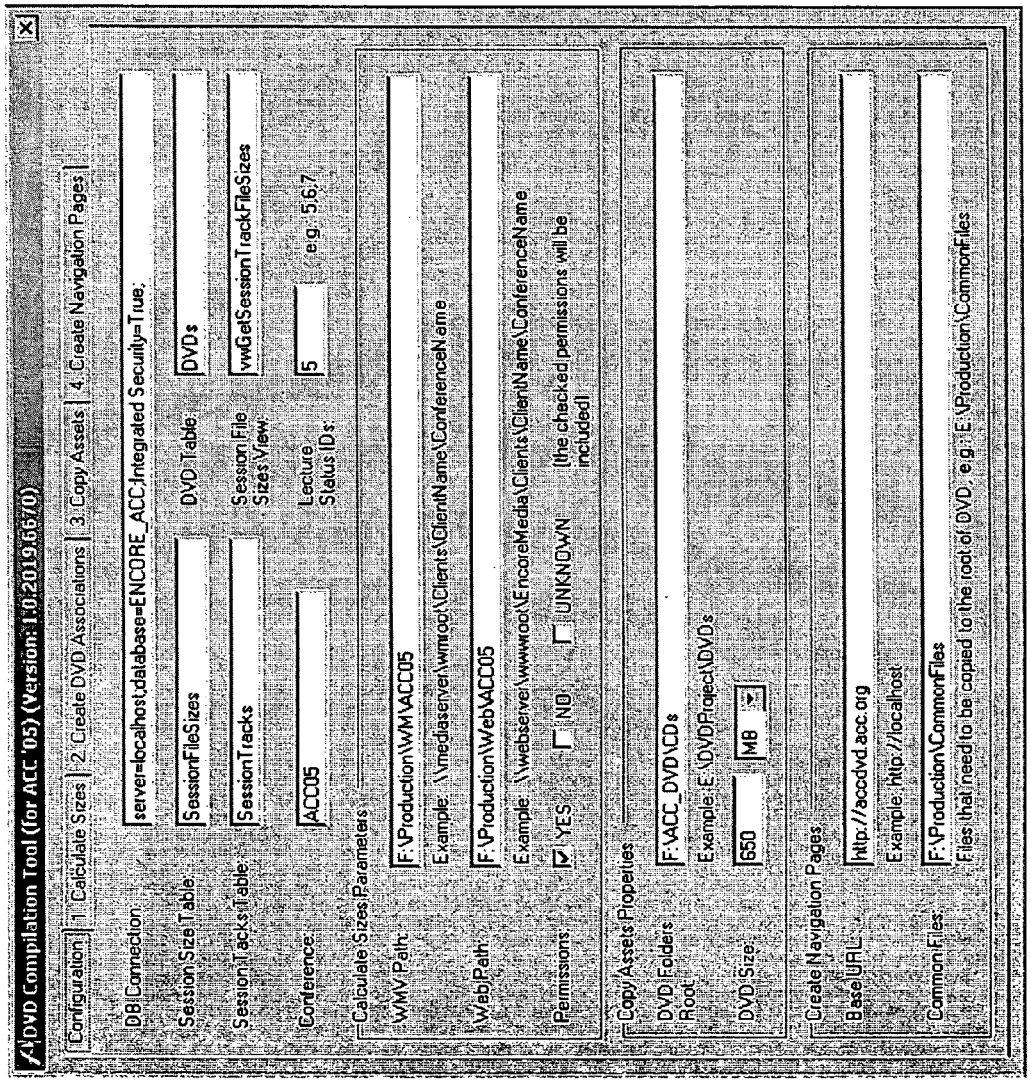
FIG. 29 depicts an exemplary user interface for a production tool according to an embodiment of the present disclosure.

FIG. 29 depicts an exemplary user interface 2900 of a production tool for publishing captured lectures according to an embodiment of the present disclosure. In the example embodiment of FIG. 29, the production tool is configured to master DVDs on-site at a conference by executing the following general steps. First, the production tool can calculate the number of discs needed to accommodate the content to be published to the discs and can be configured to automatically span several discs if needed. Next, the production tool can copy the captured media assets to be included on a specific disc to a corresponding folder (e.g., a "DVD Master" folder). Finally, the production tool can dynamically generate navigation pages and copy common files needed for the disc. These steps can be implemented in accordance with storage requirements and organizational structure for publishing to media types other than DVDs, such as podcasts, MP-3, CDs, flash memory, magnetic memory, etc.

Additionally, sponsorship information can be created in the form of logos, animations, audio files or the like, and incorporated into the published media files, and/or the media player format (e.g., banner ads), and/or media labeling. Sponsorship information can also be customized on a per volume basis or per other logical divisions of content (such as the production of discs for individuals or groups of particular individuals). Optionally, the production tool can be used to enable custom distribution media creation by end-users. For example, end-users can browse a library of captured content to select desired content for distribution and can also select a desired media type(s).

In one implementation, the production tool can include file system information such that the distribution media types are compatible with different operating systems. For example, software running on Apple, Inc. computers such as Toast® (roxio.com/en/products/mac_products.jhtml on the World Wide Web) can be used to create hybrid distribution media that includes unique contents for Mac or PC users. Likewise, software such running on computers equipped with the Windows operating system such as TransMac (asy.com/scrtm-.htm on the World Wide Web) can be also be used to produce such hybrid distribution media.

After the production tool generates an image of the captured media assets, the image can be replicated for large-scale distribution. Replication can be accomplished using a variety of devices, including robotic replication machines such as the Rimage (rimage.com/home.html on the World Wide Web), which can print labels on physical distribution media, as well as replicate the content. Additionally, replication can be accomplished using pre-printed blank physical distribution media, which can be replicated using systems such as the NEC-based replication tower (cddvdking.com on the World Wide Web).

9) Combining On-line Testing and Certification

A testing and certification tool, such as the Net.SCORE™ application available from Astute Technology, can be configured to combine on-line testing with on-line lectures for integration of learning objectives, e-commerce, testing and on-line certification. For example, the hardware/software capture platform 2105, shown in the embodiment of FIG. 21, includes a Net.SCORE web-based testing and certification tool 2140.

The testing and certification tool can be implemented to enable on-line transcript generation, as well as maintenance of a log of live event attendance credits versus on-line or enduring (i.e., hardcopy) material credits. The maintenance of such a log can help credentialing entities comply with regulations by preventing an award of double credit for the review and completion of a course that is available in both on-line and live formats. The testing and certification tool can also be implemented to enable a presenter to identify weaknesses of attendees prior to presenting a lecture. In this way, the presenter can customize the lecture prior to presenting it to specifically address the identified weaknesses, if desired.

10) Exemplary Method

Figure 30:
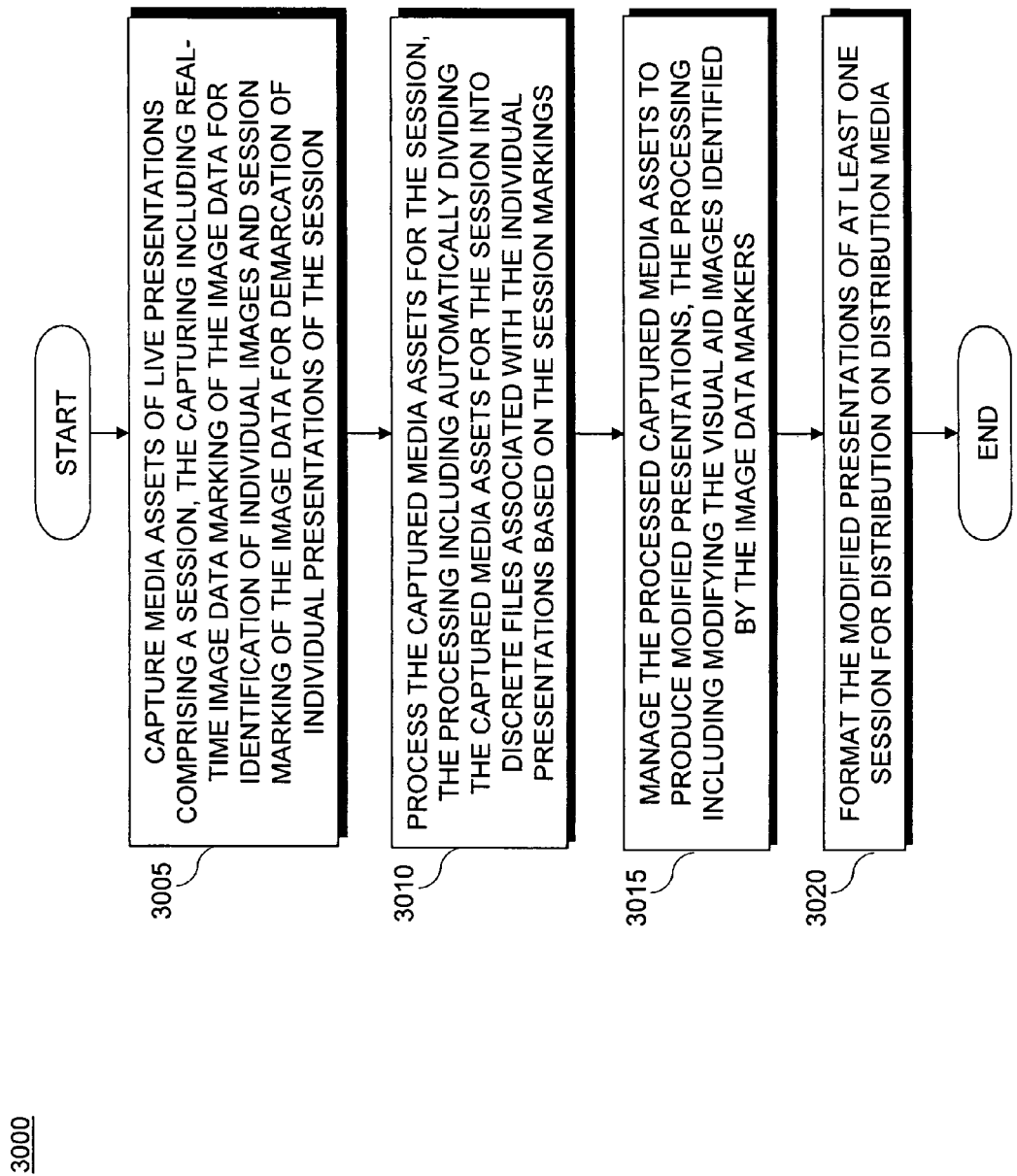
FIG. 30 is a flow chart illustrating a method for capturing, managing, and distributing live presentations according to an embodiment of the present disclosure.

FIG. 30 illustrates an exemplary method 3000 for enhanced capture, management and distribution of live presentations. Not all of the steps of FIG. 30 have to occur in the order shown, as will be apparent to persons skilled in the relevant art(s) based on the teachings herein. Other operational and structural embodiments will be apparent to persons skilled in the relevant art(s) based on the following discussion. These steps are described in detail below. It should be noted that, in accordance with an aspect of the present disclosure, the method illustrated in FIG. 30 can be employed in conjunction with a computer-based system, where the method can be implemented in hardware, software, firmware, or combinations thereof.

In step 3005, media assets of live presentations comprising a session are captured. The media assets can include image data of sequentially presented visual aids accompanying the live presentations and audio data. Exemplary visual aids include slides, photographs, graphs, discrete motion picture clips, and text. The capturing includes real-time image data marking of the image data for identification of individual images and session marking of the image data for demarcation of individual presentations of the session.

For example, a capture application, such as the capture application illustrated in FIG. 22, can be executed on a capture device to enable a user to mark the image data for identification of individual images (e.g., by setting "random" markers) and or demarcation of individual presentations of the session (e.g., by setting "in" and "out" markers). Optionally, the administrative tool illustrated in FIG. 26, can also be used to mark the captured image data for identification of individual images (e.g., by selecting the "Replace With" or "Delete" radio buttons 2605, as shown in FIG. 26). Step 3005 can also include synchronizing the captured media assets for each presentation by generating time-stamp data.

Optionally, method 3000 includes the step of editing the captured media assets, including modifying the image data/ and or session markings for a presentation and confirming the markings for each presentation. For example, in one implementation, an editor application, such as the editor application illustrated in FIG. 23, can be executed on the capture device or on the centralized device to enable a user to modify and confirm the markings set for each presentation.

In step 3010, the captured media assets for the session are processed. The processing includes automatically dividing the captured media assets for the session into discrete files associated with the individual presentations based on the session markings. For example, a server application, such as the server application illustrated in FIG. 23, can be executed on the centralized device for rapid enhancement and post processing of captured content received from the capture and/or editor applications. Additionally, to enable text searching of the presentations for the session, step 3010 can include applying optical character recognition to the image data of the visual aid images, and/or applying speech recognition to the audio data to enable transcription of the spoken words during the presentation. In one implementation, step 3010 can include analyzing the image data to automatically generate thumbnail images for each presentation that enable navigation of the presentations. In this case, the analyzing can include detecting changes in sequences of visual aid images to mark the image data.

In step 3020, the processed captured media assets are managed to produce modified presentations. The managing includes modifying the visual aid images identified by the image data markings. For example, an administrative tool, such as the web-based administrative tool illustrated in FIG. 24, can be configured for managing captured presentations/lectures, as well as for specifying particular lectures for review, quality control, and editing prior to production. In one implementation, step 3020 can include deleting the visual aid images identified by the image data markings to produce the modified presentations. In another implementation, step 3020 can include replacing the visual aid images identified by the image data markings with replacement image data to produce the modified presentations. In this case, the replacing can include stitching together the image data and the replacement image data.

In step 3025, the modified presentations of at least one session are formatted for distribution on distribution media. For example, a production tool, such as the production tool illustrated in FIG. 29, can be configured for publishing captured presentations/lectures. In one implementation, step 3025 can include formatting the modified presentations for at least one session for on-line media distribution. In another implementation, step 3025 can include formatting the modified presentations for at least one session for physical media distribution. In this case, the formatting can include dividing the formatted presentations for the at least one session into logical units when the formatted presentations span multiple physical media.

Additionally, step 3025 can include generating mechanisms for navigating the formatted presentations on the distribution media. Step 3025 can also include enabling end-user selection of desired formatted presentations for distribution on the distribution media. Step 3025 can further include incorporating customized sponsorship information into the formatted presentations for distribution on the distribution media, as well as incorporation of additional media associated with the formatted presentations (e.g., abstracts, articles or the like) for distribution on the distribution media.

Optionally, the method 3000 can include the additional step of tracking credits awarded to an attendee for completing a course by attending a live presentation to prevent awarding additional credit to the attendee for completing the same course on-line or for completing the same course using hard-copy materials. In another embodiment, the method 3000 can include the additional step of identifying weaknesses of attendees prior to delivering a presentation to customize the presentation in accordance with the identified weaknesses. For example, a testing and certification tool, such as the testing and certification tool 2140 illustrated in FIG. 21, can be configured to integrate on-line testing and certification.

CONCLUSION

Techniques consistent with the present disclosure provide, among other features, rapid conversion of live presentations into electronic media and effective management of captured media assets for distribution. The foregoing description of an implementation of the invention has been presented for purposes of illustration and description. It is not exhaustive and does not limit the disclosure to the precise form disclosed. Modifications and variations are possible in light of the above teachings or may be acquired from practicing of the disclosure. The scope of the invention is defined by the claims and their equivalents.

What is claimed is:

1. A system for capturing and distributing presentations, comprising:
    at least two capture devices configured to capture media assets of live presentations comprising a session, the media assets including 1) image data of a plurality of sequentially presented visual aids accompanying the live presentations and 2) audio data, wherein at least two of the visual aids are selected from the group of images consisting of slides, photographs, graphs, discrete motion picture clips, and text, and wherein each capture device includes an interface that enables real-time 1) image data marking of the image data for identification of individual images and 2) session marking of the image data for demarcation of individual presentations of the session;
    a centralized device configured to process the captured media assets from each capture device, wherein the centralized device is configured to automatically divide the captured media assets for the session into discrete files associated with the individual presentations based on the session markings;
    an administrative tool configured to manage the processed captured media assets to produce modified presentations, wherein the administrative tool enables modification of the visual aid images identified by the image data markings; and
    a production device configured to format the modified presentations of at least one session for distribution on distribution media.

2. The system of claim 1, wherein the centralized device includes at least one of the capture devices.

3. The system of clam 1, wherein each capture device is configured to synchronize the captured media assets for each presentation by generating time-stamp data during capture of the media assets.

4. The system of claim 1, further comprising an editing interface configured to enable modification and confirmation of the markings for each presentation.

5. The system of claim 4, wherein at least one of (1) at least one capture device and (2) the administrative tool includes the editing interface.

6. The system of claim 1, wherein the image data for a presentation includes visual aid images displayed during the presentation and further includes video images of a presenter of the presentation.

7. The system of claim 1, wherein the centralized device is configured to apply optical character recognition to the image data of the visual aid images to enable text searching of the presentations for the session.

8. The system of claim 1, wherein the centralized device is configured to apply speech recognition to the audio data to enable transcription of the spoken words during the presentations to permit text searching of the presentations for the session.

9. The system of claim 1, wherein the centralized device is configured to analyze the image data to automatically generate thumbnail images for each presentation to enable navigation of the presentations.

10. The system of claim 1, wherein the centralized device is configured to analyze the image data by detecting changes in sequences of visual aid images to mark the image data.

11. The system of claim 10, wherein the administrative tool is configured to enable modification of parameters for detecting the changes in sequences of visual aid images.

12. The system of claim 1, wherein the administrative tool enables deletion of the visual aid images identified by the image data markings to produce the modified presentations.

13. The system of claim 1, wherein the administrative tool enables replacement of the visual aid images identified by the image data markings with replacement image data to produce the modified presentations.

14. The system of claim 13, wherein the administrative tool is configured to produce the modified presentations by stitching together the image data and the replacement image data.

15. The system of claim 13, wherein the replacement image data includes at least one of advertisements, presentation previews, information related to presentations, and information related to presenters.

16. The system of claim 1, wherein the administrative tool is configured as a web-based application.

17. The system of claim 1, wherein the production device is configured to format the modified presentations of at least one session for on-line media distribution.

18. The system of claim 1, wherein the production device is configured to format the modified presentations of at least one session for physical media distribution.

19. The system of claim 18, wherein the production device is configured to divide the formatted presentations of at least one session into logical units when the formatted presentations span multiple physical media.

20. The system of claim 1, wherein the production device is configured to format the modified presentations to enable navigation of the formatted presentations on the distribution media.

21. The system of claim 1, wherein the production device is configured to enable end-user selection of desired formatted presentations for distribution on the distribution media.

22. The system of claim 1, wherein the production device is configured to enable incorporation of customized sponsorship information into the formatted presentations for distribution on the distribution media.

23. The system of claim 1, wherein the production device is configured to enable incorporation of additional media associated with the formatted presentations for distribution on the distribution media.

24. The system of claim 1, further comprising:
a certification tool configured to track credits awarded to an attendee for completing a course by attending a live presentation to prevent awarding additional credit to the attendee for completing the same course on-line or for completing the same course using hardcopy materials.

25. The system of claim 1, further comprising:
a testing tool configured to enable a presenter to identify weaknesses of attendees prior to delivering a presentation.

26. A method for capturing and distributing presentations, comprising:
capturing media assets of live presentations comprising a session, the media assets including 1) image data of a plurality of sequentially presented visual aids accompanying the live presentations and 2) audio data, wherein at least two of the visual aids are selected from the group of images consisting of slides, photographs, graphs, discrete motion picture clips, and text, and wherein the capturing includes real-time 1) image data marking of the image data for identification of individual images and 2) session marking of the image data for demarcation of individual presentations of the session;
processing the captured media assets for the session, wherein the processing includes automatically dividing the captured media assets for the session into discrete files associated with the individual presentations based on the session markings;
managing the processed captured media assets to produce modified presentations, wherein the managing includes modifying the visual aid images identified by the image data markings; and
formatting the modified presentations of at least one session for distribution on distribution media.

27. The method of claim 26, wherein the capturing the image data comprises capturing video images of presenters of the presentations.

28. The method of claim 26, wherein the capturing comprises synchronizing the captured media assets for each presentation by generating time-stamp data.

29. The method of claim 26, further comprising editing the captured media assets.

30. The method of claim 29, wherein the editing comprises modifying the markings for a presentation.

31. The method of claim 29, wherein the editing comprises confirming the markings for each presentation.

32. The method of claim 26, wherein the processing comprises applying optical character recognition to the image data of the visual aid images to enable text searching of the presentations for the session.

33. The method of claim 26, wherein the processing comprises applying speech recognition to the audio data to enable transcription of the spoken words during the presentations to permit text searching of the presentations for the session.

34. The method of claim 26, wherein the processing comprises analyzing the image data to automatically generate thumbnail images for each presentation that enable navigation of the presentations.

35. The method of claim 34, wherein the analyzing comprises detecting changes in sequences of visual aid images to mark the image data.

36. The method of claim 35, wherein the managing comprises modifying parameters for detecting the changes in sequences of visual aid images.

37. The method of claim 26, wherein the managing comprises deleting the visual aid images identified by the image data markings to produce the modified presentations.

38. The method of claim 26, wherein the managing comprises replacing the visual aid images identified by the image data markings with replacement image data to produce the modified presentations.

39. The method of claim 38, wherein the replacing comprises stitching together the image data and the replacement image data.

40. The method of claim 26, wherein the formatting comprises formatting the modified presentations of at least one session for on-line media distribution.

41. The method of claim 26, wherein the formatting comprises formatting the modified presentations of at least one session for physical media distribution.

42. The method of claim 26, wherein the formatting comprises dividing the formatted presentations of at least one session into logical units when the formatted presentations span multiple physical media.

43. The method of claim 26, wherein the formatting comprises generating mechanisms for navigating the formatted presentations on the distribution media.

44. The method of claim 26, wherein the formatting comprises enabling a user to select desired formatted presentations for distribution on the distribution media.

45. The method of claim 26, wherein the formatting comprises incorporating customized sponsorship information into the formatted presentations for distribution on the distribution media.

46. The method of claim 26, wherein the formatting comprises incorporating additional media associated with the formatted presentations for distribution on the distribution media.

47. The method of claim 26, further comprising:
tracking credits awarded to an attendee for completing a course by attending a live presentation to prevent awarding additional credit to the attendee for completing the same course on-line or for completing the same course using hardcopy materials.

48. The method of claim 26, further comprising:
identifying weaknesses of attendees prior to delivering a presentation to customize the presentation in accordance with the identified weaknesses.

49. A distribution medium comprising a formatted presentation produced according to the method of claim 26.

50. A system for capturing and distributing presentations, comprising:
means for capturing media assets of live presentations comprising a session, the media assets including 1) image data of a plurality of sequentially presented visual aids accompanying the live presentations and 2) audio data, wherein at least two of the visual aids are selected from the group of images consisting of slides, photographs, graphs, discrete motion picture clips, and text;
means for real-time image data marking of the image data for identification of individual images;
means for real-time session marking of the image data for demarcation of individual presentations of the session;
means for processing the captured media assets, the processing means configured to automatically divide the captured media assets for the session into discrete files associated with the individual presentations based on the session markings;
means for managing the processed captured media assets to produce modified presentations, the managing means configured to modify the visual aid images identified by the image data markings; and
means for formatting the modified presentations of at least one session for distribution on distribution media.

* * * * *

UNITED STATES PATENT AND TRADEMARK OFFICE
CERTIFICATE OF CORRECTION

PATENT NO. : 7,689,898 B2 Page 1 of 1
APPLICATION NO. : 11/580092
DATED : March 30, 2010
INVENTOR(S) : Jonathan Merril et al.

It is certified that error appears in the above-identified patent and that said Letters Patent is hereby corrected as shown below:

On page 1, delete the following sentence between Item Nos. (73) and (21):

"This patent is subject to a terminal disclaimer."

Signed and Sealed this

Fourteenth Day of September, 2010

David J. Kappos
*Director of the United States Patent and Trademark Office*